United States Patent [19]

Borbas et al.

[11] 3,767,863

[45] Oct. 23, 1973

[54] COMMUNICATION SWITCHING SYSTEM WITH MODULAR ORGANIZATION AND BUS

[75] Inventors: Robert A. Borbas; John P. Dufton; Robert W. Duthie; John T. Lighthall; Thomas J. Moorehead; George Verbaas, all of Borckville, Ontario, Canada

[73] Assignee: GTE Automatic Electric Laboratories Incorporated, Northlake, Ill.

[22] Filed: May 22, 1972

[21] Appl. No.: 255,485

[52] U.S. Cl. .............................................. 179/18 ES

[51] Int. Cl. .............................................. H04q 3/54

[58] Field of Search ................................ 179/18 ES

[56] References Cited

UNITED STATES PATENTS

| | | | |
|---|---|---|---|
| 3,479,466 | 11/1969 | Damiano et al. | 179/18 ES |
| 3,626,108 | 12/1971 | Oswald et al. | 179/18 ES |
| 3,409,877 | 11/1968 | Alterman et al. | 340/172.5 |

*Primary Examiner*—Thomas W. Brown

*Attorney*—K. Mullerheim et al.

[57] ABSTRACT

The system has duplicate central processors, each having its own bus. Subsystem modules include program memory, data base memory, status detector, register-senders, markers, etc., each having one or more memory word stores. Bus interface units of identical construction are interposed between the subsystem modules and the busses. Some modules such as program memory are duplicated and each connected to one bus, while others are connected via their interface unit to both busses. All memory addresses are accessed from a processor via its bus, each address being effective to select only one interface unit, and the complete address being then passed to the subsystem module to read or write a data word.

20 Claims, 9 Drawing Figures

PATENTED OCT 23 1973 3,767,863
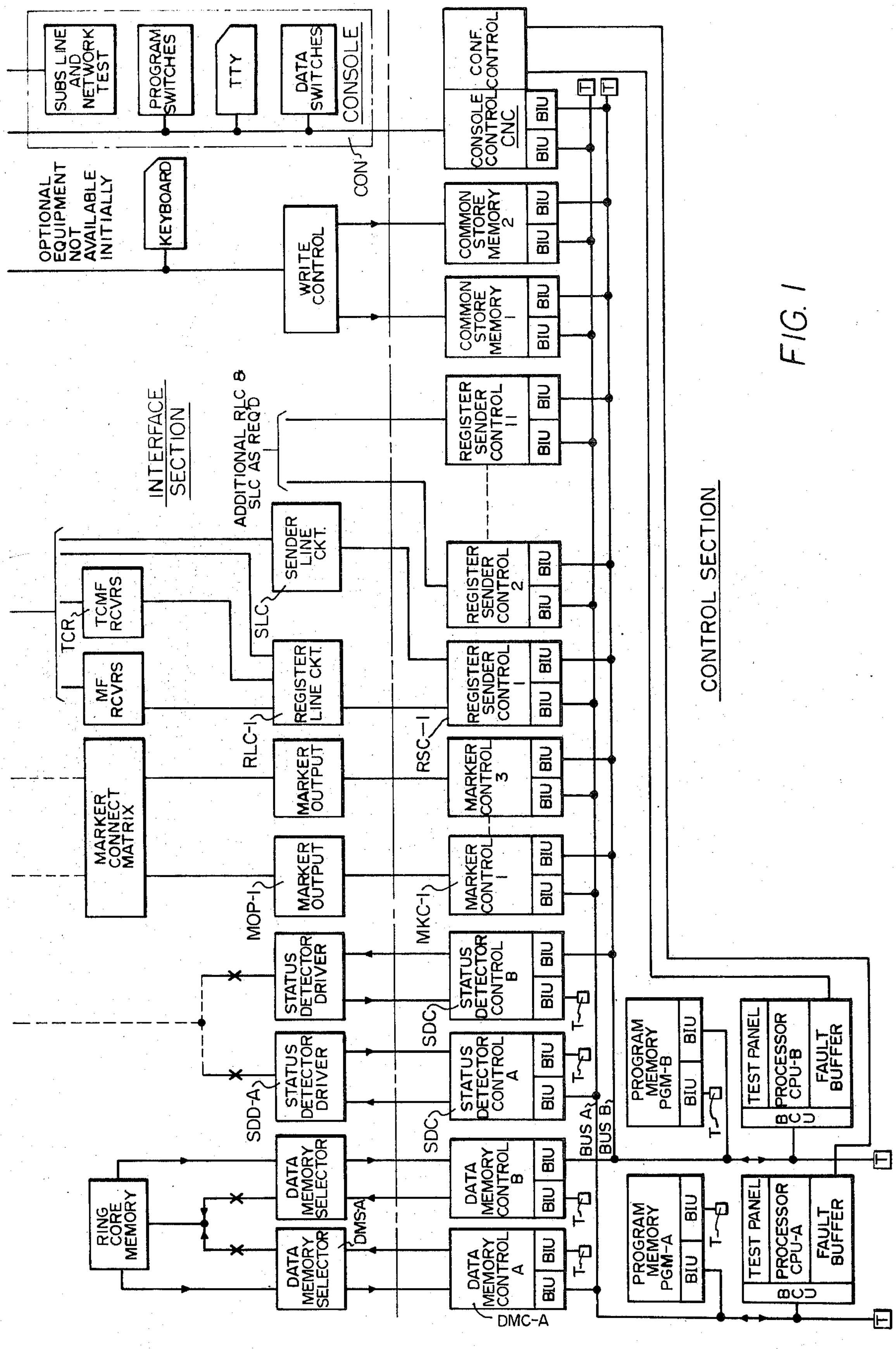

PATENTED OCT 23 1973 3.767.863

SHEET 2 OF 8

SYSTEM BLOCK DIAGRAM

EXPANSION OF EXISTING SYSTEM SI TO S2

COMMUNICATION SWITCHING SYSTEM WITH MODULAR ORGANIZATION AND BUS

BACKGROUND OF THE INVENTION

1. Field of the Invention

This invention relates to a communication switching system with modular organization and having a bus interconnecting a central processor with the modular subsystems; and more particularly to a telephone switching system having a stored program central processor in which subsystems are provided with a portion of the system memory, with the transfer of information between the central processor and the subsystems via the bus.

2. Description of the Prior Art

There are now many known telephone switching systems having central processors of either the stored program or wired logic type in which communication with subsystems is provided by some sort of a bus arrangement. However these systems generally have an overall design concept such that a redesign of any one subsystem would require a redesign of the processor and other subsystems, and the circuits for sending and receiving information between the processor and subsystems have been an integral part of each such subsystem.

SUMMARY OF THE INVENTION

An object of this invention is to provide a switching system organization which provides a standardized communication channel among all subsystems, which makes it possible to design each subsystem independently of all the others, and to use the various subsystems in different systems comprising a family of systems.

According to the invention bus interface units are provided for interfacing between the bus and the subsystem modules, these units being substantially identical except for connections within the unit for detecting that the address received from the central processor is for a memory location within the particular subsystem. A bus control unit connected to the central processor controls the supplying of a memory address via the bus, and controls the operation of supplying an address and transferring a word of data between a subsystem module and a central processor.

Further, according to the invention, the central processors and bus are duplicated for reliability, with a least some of the subsystem modules being accessible from either bus, and the bus interface unit being provided with a lockout circuit so that the subsystem is accessed via only one bus at a time, and access is provided via the other bus as soon as the data transfer operation of one is completed.

CROSS-REFERENCES TO RELATED APPLICATIONS

This invention is related to Small Exchange Stored Program Switching System by R. W. Duthie and R. M. Thomas disclosed in U.S. Pat. No. 3,487,173 issued Dec. 30, 1969. The memory arrangement of the system, and particularly the storage readout circuits SR for reading from temporary memory stores is disclosed in the U.S. Pat. No. 3,587,070 issued June 22, 1971 to R. M. Thomas for a Memory Arrangement Having Both Magnetic-Core and Switching-Device Storage with a Common Address Register. The switching network is disclosed in U.S. Pat. No. 3,624,305 issued Nov. 30, 1971, by G. Verbaas for a Communication Switching Network Hold and Extra Control Conductor Usage. Modifications of the system are disclosed in the following U.S. Pat. applications: Ser. No. 102,414 filed Dec. 29, 1970 now U.S. Pat. No. 3,729,718 issued Ap. 24, 1973, by J. P. Dufton and B. G. Hallman for Computer Having Associative Search Apparatus; Ser. No. 102,462 filed Dec. 29, 1970, now U.S. Pat. No. 3,729,711 issued Ap. 24, 1973, by J. P. Dufton and J. H. Foster for Shift Apparatus for Small Computer; Ser. No. 102,413 filed Dec. 29, 1970 by R. M. Thomas and B.G. Hallman for Indirect Addressing Apparatus for Small Computer; Ser. No. 122,492 filed Mar. 9, 1971, now U.S. Pat. No. 3,678,197 issued July 18, 1972, by R. B. Panter et al. for Dial Pulse Incoming Trunk and Register Arrangement; Ser. No. 142,649 filed May 12, 1971, now U.S. Pat. No. 3,703,708 issued Nov. 21, 1972, by J. H. Foster for a Memory Arrangement in a Central Processor; and Ser. No. 192,828 filed Oct. 27, 1971 by J. P. Dufton for a Stored Program Small Exchange with Registers and Senders. The system of the Duthie et al patent with the modifications described in the above patent applications is referred to hereinafter as the System S 1; while the new system disclosed in the present application is referred to as System S2.

The present System S2 application and an application Ser. No. 295,630 filed Oct. 6, 1972 by R. A. Borbas for a Bus Control Arrangement for a Communication Switching System have substantially the same disclosure, the modular organization of the system with identical bus interface units except for address connections for the subsystem modules having been invented by the inventors named herein; while R. A. Borbas is the inventor of the bus control arrangement including the design of the bus control unit and the bus interface units.

The Lockout Selection Circuit disclosed in the bus interface units was invented by T. J. Moorehead, covered by U.S. application Ser. No. 275,593, filed July 27, 1972; and R. A. Borbas invented the combination of the lockout selection circuit with the bus control arrangement.

The mechanical aspects of the bus which permit a subsystem card to be removed without breaking the continuity of the bus are covered by U.S. application Ser. No. 289,501 filed Sept. 15, 1972 by J. Maruscak and S. K. Roy.

DESCRIPTION OF THE DRAWINGS

FIGS. 1 and 2, arranged as shown in FIG. 3, comprise a block diagram of a communication switching system according to the invention;

DESCRIPTION OF THE PREFERRED EMBODIMENT GENERAL

Figures 2, 3:
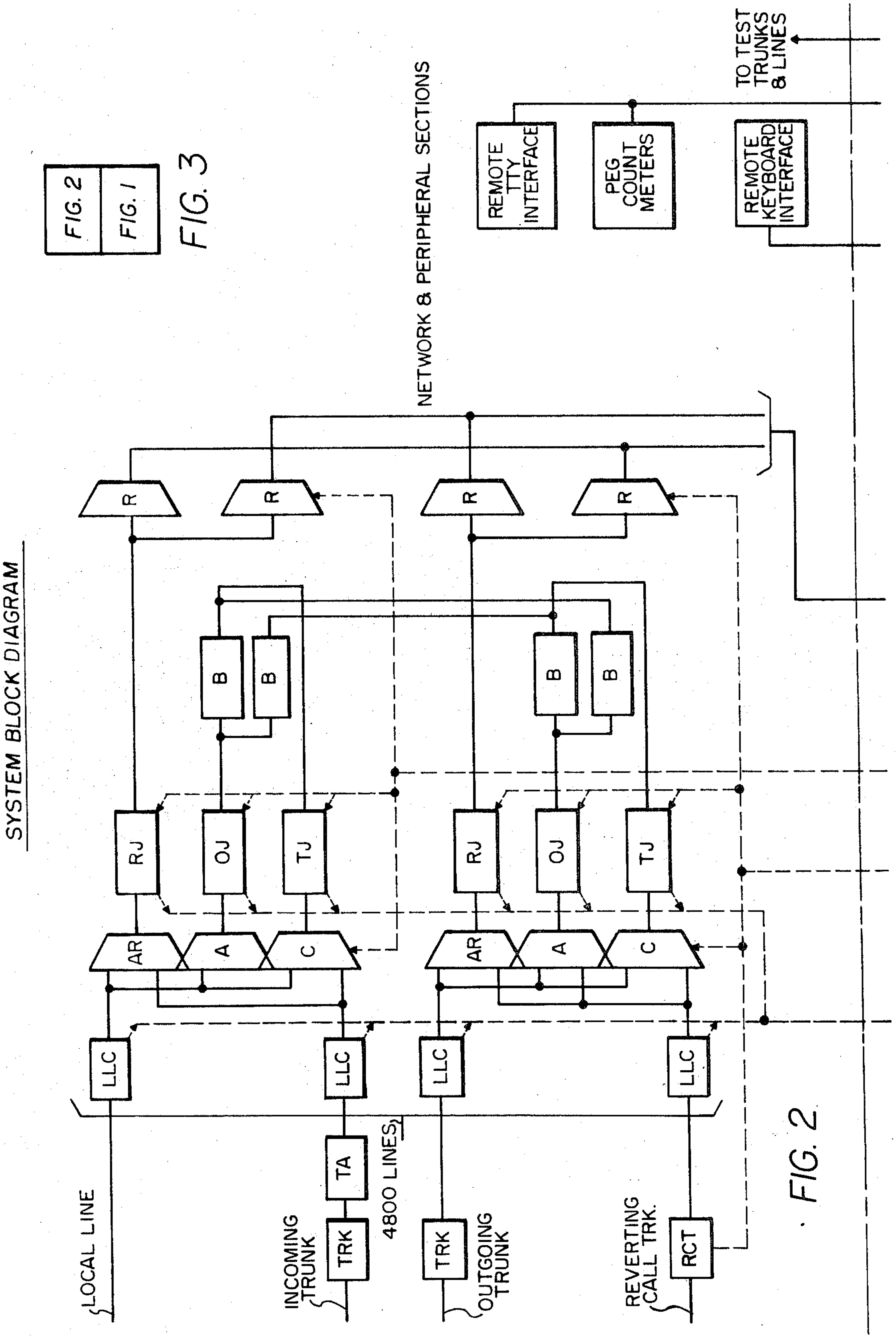

The organization of the new System S2 is shown in FIGS. 1 and 2, arranged as shown in FIG. 3.

The most significant new features of the System S2 common control (FIG. 1) are the use of a Databus system organization, and the use of a MOSFET semiconductor memory for program storage.

The Databus provides a highly standardized communication channel among all subsystems such as markers, central processing unit, registers, etc. The Databus consists of only 26 paired wires, duplicated for reliability. It is thus possible to design each subsystem independently of all the others, and each becomes a plug-in module. Subsystem modules may now be general purpose and used without change in other systems such as PABX's, etc. which may be developed in the future. Furthermore, changes in technology may be more easily incorporated into the system since one subsystem module can be replaced without affecting the design of the others. Subsystems duplicated for reliability simply use two identical modules, a great advantage in the manufacture of the system, and a feature which nearly halves the number of drawings required to maintain the system.

The MOSFET memory for program storage utilizes a unique semiconductor device which allows the storage of 2048 20-bit words of memory on one printed card 12 × 13 inches. The equivalent of three System S1 ring core memory modules each 6 feet long is replaced by one of these printed cards. An even more important feature than the size reduction, is the ease with which programs can be updated. As this memory is electronically programmed in a special machine, a complete program change can easily be made. The information stored in the memory can only be erased by exposing the MOSFET "chips" to high intensity ultraviolet light so there is no danger of program loss through power failures, component failures and human errors, yet cards can be reprogrammed.

However, this memory is not suitable for data base memory where changes are constantly being made in the field, so a ring core memory generally similar to that of System S1 is used for this application.

The System S2 common control makes extensive use of integrated circuits including many MSI (Medium Scale Integration) devices.

To summarize the features of System S2, it provides the system with more capacity and a lower getting started cost by the evolutionary development of the common control only. Accordingly, all the features of the System S1 will continue to be available with the System S2. It will also be possible to expand an existing in-service System S1 by replacing the System S1 common control with a System S2 common control.

Network Expansion

The network in a System S2 (FIG. 1) is expanded very simply by connecting two 2400 line System S1 networks together by the parallel addition of B stage links and R stage links. In this way virtually no changes are necessary in the hardware, no new hardware needs to be designed, and most important the network has the same low getting-started cost as the present system. No change in the network cost curve occurs until the office exceeds the 2400 line point. The parallel addition of B links and R links required above 2400 lines means that the present 24 × 24 B stage matrix is increased at 2400 lines to a 48 × 48 matrix, and the 144 × 32 R stage matrix is increased to a 288 × 64 matrix.

In FIG. 1 typical line and trunk terminations are shown for the line circuits LLC, these and other types being mixed in each 2400-line section as in System S1.

Capacity

The System S2 is designed to enhance System S1 by reducing costs and expanding its capacity. System S2 is an evolutionary improvement of System S1; it uses many of the same concepts, the same network — simply expanded, the same trunks, and the same power equipment.

The higher capacity control allows the following capacities for System S2.

4800 Lines and trunks 9100 Directory numbers
4 Office codes in one system
10000 Busy hour attempted calls
23000 CCS traffic capacity
44 Registers (full availability)
20 Senders (full availability)

Common Control Physical Arrangement

The use of the Databus allows the design of a highly modular system. Accordingly, the packaging must also be modular.

These are two general classes of circuits, those implemented in high speed integrated circuits and those implemented in relatively low speed discrete components including relays. Since the low speed devices generate electronic noise, they must be physically isolated from the high speed devices. We have, therefore, divided all of the equipment into two sections: the interface section for the low speed, and the control section for the high speed. All of the System S2 common control mounts on printed cards approximately 12 × 13 inches. All cards plug into files of two types.

The interface section equipment mounts in standard electromechanical card files, five files to a 27 ½ inches wide by 96 inches high × 15 inches deep single sided sheet metal frame. Wiring to the network and control section is terminated on wire-wrap terminal blocks.

The control section uses 20 ¼ inches wide single-sided frames, but a modified card file is used which allows more heat to be dissipated. Five files may be mounted on one rack. Each control section file or module contains a single subsystem, and is a self contained unit, having its own card mounted plug-in cable cards to the interface section. Covers are provided front and rear for protection and to improve the flow of air by convection currents through the file. On some modules, a test panel is provided in place of the front cover.

The ring core memory modules required are mounted four modules per 27 ½ inch wide frame, with a file of drive circuits mounted at the top of every second rack.

The System S2 uses bipolar integrated circuit logic rather than discrete germanium transistor logic circuits. The card design concept used in System S1 was that of a building block design where a number of identical logic elements were mounted on one card; for example four flip-flops, six NOR gates, etc. Since one integrated circuit is equivalent to two flip-flops or one-half of a System S1 card, and since an integrated circuit takes up very little area on a card, the building block concept is not very practical since only very small cards would result with a great deal of wiring, and the cost reduction potential of the integrated circuits would not be fully utilized. Therefore in System S2, the concept is to mount as much of a subsystem as possible on a single card, called a functional card, and to make the card as large as possible.

The result of this is that the System S2 has only about one-eighth as many cards, one-eighth as many components, one-third as much wiring as determined from a count of connector pins, and about two-thirds as many square inches of printed card area. The System S2 cards are about four times as big as the System S1 cards. The one disadvantage of the functional card concept is that number of card types is more than doubled from 23 to 55.

One advantage in having fewer cards in an office is that maintenance will be simplified. The problem of finding one faulty card in 165 is much simpler than finding one faulty card in 1232.

Common Control Description

The System S2 common control is divided into two sections, the Control Section and the Interface Section. A total of seven different subsystems or modules are used in the control section and six different subsystems in the interface section. Each subsystem is described briefly below.

Central Processing Unit - CPU

The central processing unit CPU, a control section module, is similar to the System S1 central processing unit except that the number of OP (operation) codes has been expanded slightly to ease the programming task and improve the speed of operation. The use of the Databus requires the extensive use of indirect addressing so this capability has been provided, and the amount of temporary storage available for use by the program has been expanded. The central processing unit CPU is built entirely of integrated circuits. The fault buffer is built into the central processing unit CPU module and a test panel is provided with each central processing unit CPU in the system. Duplicated central processing units CPU-A and CPU-B are provided, one controlling each Databus. The central processing unit CPU will execute an average of 150,000 instructions per second as compared to the System S1 central processing unit which could perform 25,000 instructions per second.

Program Memory — PGM

The program memory module contains the stored program which allows the central processing unit CPU to control the exchange. The memory device used is a MOSFET semiconductor memory. Each card stores 2048 instruction words of 20 bits each. A maximum of 8192 words can be stored in a single module, however, normally only 6144 will be supplied (i.e., three cards). Two program memory modules are required, one for each Databus, and additional program memory modules can be provided to handle special applications where more than 8192 words are required.

Console Control — CNC

The Console Control subsystem contains the configuration controller (which determines which system will be on line) traffic distributor, peg count buffer, printer buffer, and program switch facilities for calling up maintenance programs. It is not provided in duplicate.

Console — CON

The console consists of a single interface file and a console panel. All of the System S1 test features appropriate to System S2 are provided, including the subscriber's line and network test features.

Data Memory Control — DMC

The data memory is used to store all of the subscriber and trunk related data including directory number to equipment number translations, class of service, and trunk tables. The organization of the data memory is improved from System S1, allowing more flexibility of office changes in the data base and flexibility in assigning directory number groups, office codes, etc.

The data memory control DMC allows the central processing unit CPU via the Databus to interrogate the ring core memory modules. The data memory control DMC is connected to the data memory selector described below. The data memory control DMC is duplicated with one data memory control DMC on each Databus.

Data Memory Selector — DMS

The data memory selector is a file of cards containing duplicated memory drivers, switches and sense amplifiers, sufficient for eight ring core modules of 700 words each. It operates under the control of the data memory control DMC.

Status Detector Control — SDC

The status detector control is used to interrogate the status sensing contacts in the line circuits and junctors of the network. Under the control of the central processing unit CPU via the Databus, it can determine the call for service of 12 to 48 lines simultaneously, depending on office size. It can also report back to the central processing unit CPU the status of an individual line or link. The status detector control SDC is connected to the Status Detector Drivers as described below.

The status detector control SDC is provided in duplicate with one status detector control on each Databus.

Status Detector Drivers — SDD

The status detector drivers contain the actual current drivers. While in concept the scheme used to look at relay contacts is the same as the System S1, all of the circuit techniques have been improved to make the system immune to accidental shorts, grounds, and false potentials being applied to the sensing leads that run throughout the network equipment. In addition the circuitry has been partitioned and duplicated so that faults do not affect service to more than 1200 lines. In order to locate troubles more rapidly more fault isolation circuitry is being provided in the status detector drivers SDD. These changes require that the small printed cards associated with the line relay units, RJ units and TJ units be changed.

Two files are required to mount the duplicated status detector drivers SDD with additional cards added when the office grows over 1200, 2400 or 3600 lines.

Marker Control — MKC

The marker control module contains the storage circuits and timing circuits which control the establishing of a path in the network.

A single marker can set up only one call at a time. In offices up to 2400 lines one marker can handle the full traffic load but over 2400 lines it is necessary to be able to mark two paths simultaneously. Therefore, in offices below 2400 lines two markers are provided for reliability, and in offices over 2400 lines three markers are provided so that loss of any single marker will not degrade service. Since only one Databus is "on-line" at one time, the other being on "standby", the marker controls MKC must be connected to both Databuses. If a fault is detected in the marker control MKC it will busy itself out and no longer be used by the central processing unit CPU.

Marker Output — MOP

The Marker Output consists of reed relays driven from the marker control MKC which operate to connect potentials to the crosspoint switches causing paths to be connected. The marker output MOP also contains the junctor command, trunk command, and network fault detection circuits.

Since two markers may not mark a path in the same area of the network at the same time (or a double connection would occur) a marker connect matrix of correeds is provided. This matrix allows any of the markers to be connected to any part of the network. One marker output MOP is housed in a single file and is permanently connected to a marker control MKC. Thus two marker outputs MOP's are always supplied with a third unit supplied to offices over 2400 lines.

Register Sender Control — RSC

A register sender control module contains all digit storage and logic for four registers and two senders. The amount of storage provided is greater than that provided in the System S1 machine in order to simplify programming. Since the cost of storage using MSI (median scale integration) devices is much less than the cost of the discrete component flip-flop circuits in the System S1, no cost penalty is incurred and an overall saving is achieved. The register is now capable of storing 13 dialed digits so that a sender need not be assigned to a call until outpulsing is required. The sender has storage for 16 digits (including routing digits) and storage for the calling line directory number ANI (automatic number identification) data. In System S2 the ANI stores do not need to be engineered separately.

The register provides for the pulse bypass system of handling incoming trunk calls from direct controlled offices, covered by said Panter patent for a Dial Pulse Incoming Trunk and Register Arrangement.

In a similar manner as the marker control MKC, a register sender control RSC module has connections to both Databuses. A minimum of two modules are provided, with additional modules provided according to traffic requirements. A maximum of elevan modules can be provided in a System S2, the limitation being the number of R stage outlets in the network. The register circuits are provided two per card; the sender circuits one per card, so that the register sender control RSC modules need not be fully equipped. The registers are arranged to receive dial pulse, TCMF, and 2/6 MF signalling from the register line circuit and tone receivers described below. The senders are arranged to provide both 2/6 MF signalling and dial pulse signalling to the sender line circuit described below.

Register Line Circuit — RLC

The register line circuit provides the interface circuit to the switching network from the register circuit in the register sender control RSC. It provides dial tone, busy tone, automatic number identification ANI party detection, and the battery feed. Two circuits are provided on one card with a maximum of ten cards per file. A unique feature is offered in the file wiring in that register line circuit RLC cards and touch calling MF (TCMF) tone receiver cards are interchangeable. Thus the number of files required depends on the total requirement for register line circuits RLC's and touch calling MF tone receivers.

Touch Calling Tone Receiver — TCR

The touch calling tone receiver is a single card which enables a register to receive standard subscriber generated tone signals. It mounts in the register line circuit RLC files. One card is required for each register which is to be equipped for touch calling MF receiver signalling. Registers so equipped, will be able to receive both dial pulse and tone signals.

2/6 MF Receiver — MFR

The MF receiver is a set of four cards which allow a register to receive 2/6 MF tone signals from incoming trunks. They are mounted in an MFR file which provides for up to four MF receivers.

Sender Line Circuit — SLC

The sender line circuit provides the interface from the sender circuits in the register sender control RSC to the switching network. It provides for both 2/6 MF and dial pulse signalling. One card is required for each sender line circuit SLC and is plugged into a sender line circuit file which provides for ten sender line circuits.

Expansion of System S1

Figure 4:
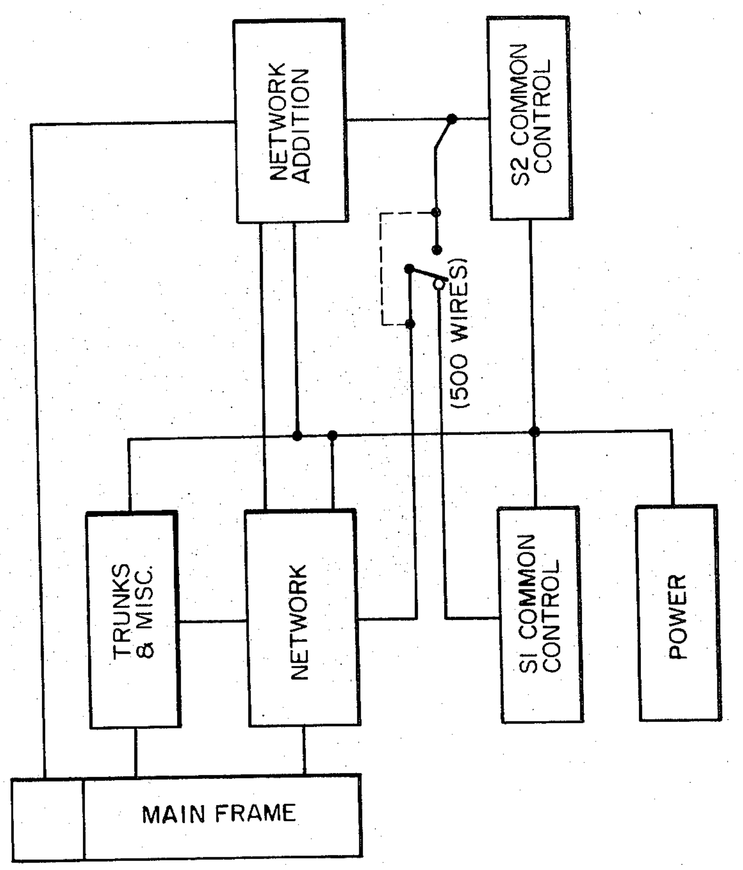
FIG. 4 is a block diagram showing expansion of an existing system.

The evolutionary design concept of the System S2 common control means that virtually no design changes are necessary in the network, trunk, and power equipment. It is, therefore, possible to retrofit a System S1 office with a System S2 common control in order to allow the office to grow from 2400 lines to 4800 lines. FIG. 4 will assist in understanding how this can be accomplished.

The first step is to install the System S2 common control and the network addition. The new common control and network are then fully tested as a stand alone switching system. An applique cable must then be installed in each System S1 network cabinet. As this wiring change is compatible with System S1 and System S2 it can be installed on a live system. Approximately 500 wires must then be brought through a transfer switch device as shown in FIG. 4. All network cabling from the network addition to the existing network is installed. Since it is always a parallel addition over existing wiring, no problems should be encountered.

We are now ready to cutover. The small printed cards associated with the line relay units, RJ units, and TJ units are removed. The System S1 common control is turned-off, the transfer switch operated, and the System S2 common control turned-on. A new set of cards is plugged back-in. This procedure should not require more than 10 minutes to complete, and it is only during the time that all cards are removed that the office is totally out of service.

The System S1 common control may now be removed and reused at a new office.

In concept the whole procedure is quite simple, however, it should be emphasized that great care must be given to the operation of rewiring the 500 leads from the System S1 common control to the trasfer device. It will have to be done one wire at a time with a test after each wire is run to make sure no problems have developed. A detailed procedure will have to be followed exactly.

SUMMARY

The System S2 is simply an evolutionary development of the common control designed for greater capacity and lower costs. The same network, trunk, power equipment is used. The System S2 common control can be retrofitted to a System S2 to allow expansion beyond 2400 lines. System S2 merely doubles all of the physical parameters of the System S1, i.e., 2400 to 4800 lines, 22 to 44 registers, 10 to 20 senders, 11500 ccs to 23000 ccs, 4900 to 9100 directory numbers. All System S1 features are retained and no new subscriber features will be offered initially.

The unique characteristics of the Databus, however, provide for the addition of new features in the future, by the ease with which new hardware systems can be added. The MOSFET program memory enables the software required to implement the features in the new hardware to be conveniently provided. One optional feature in this class is an electrically alterable memory shown in FIG. 1 which will allow data base changes to be made from a remote keyboard.

FAMILY OF SUBSYSTEM MODULES

It is desirable for a communication switching system to have a family of interrelated units which can be engineered together with a minimum of new design to meet almost any switching requirement. This family of units is best developed by evolutionary processes in such way that even the most recently developed unit continues to interrelate with the earliest units. The hardware used, the packaging concepts employed and the system concepts should change as little as possible. The system S2 described above may be used for such a family of units. Although System S2 has been shown configured with a single processor (duplicated), it may also be used as a parallel processor arrangement, to allow for applications requiring greater processing capacity. Many of the common control subsystems can be considered as general purpose, such as the program memory, register-sender, data memory, and console control. The marker and status detector tend to be network oriented, so while the techniques employed in these subsystems may be used, changes are required for different networks.

In addition to the control modules shown in FIG. 1, a family of control modules needs a magnetic tape control module, a disc control module, an operator's position module, a data bus buffer, and an interoffice signalling module.

A very small central office or a private automatic branch exchange with an unduplicated common control would require only a single central processing unit with a single data bus, a program memory, a register-sender control module and associated subsystem, a status detector control and associated subsystem, a marker control along with the subsystem including the marker output and network. A small central office would also require a data memory control and associated subsystem, while a small PABX would require a position control module with associated subsystem including attendant's cabinet and class of service and translation data.

A multi-office complex may comprise several large offices trunked to a tandem office. All signalling between processor complexes is switched by the processor in one office. This processor also provides for centralized maintenance, administration and traffic management. The central processor provides for register, sender and translator processing, while the individual offices provide for marker processing, etc. The central processing office is connected to the others by a data link with data buffers at each end.

Thus the general purpose control modules are a family of mutually compatible modular subsystems designed for use in electronic switching systems.

Use of these modules in the development of new systems provides immediate solutions to many problems facing the designer of electronic switching systems. Some of these problems are:

a. The long turnaround time required to design a system and get it into service.

b. The expense to the manufacturer in hardware, personnel training and inventory, which is incurred each time a new technology is introduced into the shop.

c. Our inability to introduce useful advances in technology into existing product lines without major system changes.

d. Short production runs of hardware for any one system.

e. Software incompatibility between systems, which prevents reuse of programmers' skills.

f. The high cost to the operating companies of training maintenance personnel for each different system.

g. The high cost to the operating companies of maintaining different sets of spares for each type of system.

h. The amount of documentation required for each new system.

This hardware family is designed to eliminate or reduce these specific problems.

There are a few main ideas central to the design of this family.

a. Reasonable module size and complexity. In general, each functional subsystem consists of one or two rack mounted modules. This provides simplicity in packaging and system design while retaining a low "getting-started" cost and maximum flexibility.

b. A 20-bit parallel high-speed Databus joining all subsystems. Clearly, if one reduces the number of interconnection points between modules the interfacing costs are also reduced. All functional subsystems are joined by this versatile 2-way bus. Standard positive-level logic is used on the bus; internally, each subsystem uses logic levels best suited to its tasks. As additional benefits, installation costs are reduced and fault isolation is speeded up.

Functional subsystems may be intermixed freely on the bus to satisfy system requirements. Multiple-bus systems are provided for to provide duplication and/or to increase data-handling capacity.

The physical structure of the bus is closely controlled to provide maximum noise immunity.

c. A simple modular package designed for the telephone-office environment.

d. Physical separation of "control" and "interface" modules. Functional subsystems which must interact with electrically noisy parts of the office have interface sections on frames separate from the control sections.

Noisy cabling is never brought into the frames containing high-speed control circuits; these circuits thus operate in a "clean" environment. The one exception to the rule is in the status detector control in which the sense leads extend out to the network through the status detector driver modules. A pre-engineered built-in grounding system and straightforward, uniform grounding and interfacing practices ensure freedom from noise problems.

Some systems will require modules not in the standard family. The parts used in the modules are available separately. These include:

a. Modules of both types, with card guides.
b. Backplanes of both types, complete with connectors, terminal blocks, and ground planes, unwired.
c. Cable cards and assemblies for connecting electronic modules to interface modules.
d. BCU and BIU cards.
e. Bus cable assemblies and terminator cards.
f. Power converters, DC-DC. Fit in 2 card positions. Floating outputs. Single 60-watt and dual 20-watt units. Voltages from 3 to 34 available by backplane strapping. Current-limiting, with built-in crowbars. Blocking-oscillator type for high efficiency.
g. Extender cards for trouble shooting.
h. Frames and stiffeners for user-built cards.

By using these standard parts, circuit design time for a new module is cut approximately in half and package design is eliminated except for layout of cards peculiar to the new module.

THE DATABUS SYSTEM

This is a high-speed 2-way DC bus linking all subsystems and is known as a Databus. Single, duplicated, or multiple-bus configurations are provided for since all telephone systems except the very smallest can be expected to use at least a duplicated structure for reliability.

Each bus contains 20 address/data lines and six control lines. It connects subsystems in a "daisy-chain" pattern via special connectors at the rear of each control module. In order to maximize speed and provide high noise immunity, the bus is terminated at each end by a plug-in terminator card. The bus may be extended at any time by removing the terminator card, plugging on a short bus extension, and replacing the terminator card at the end of the bus.

The bus is controlled by a bus control unit BCU card in the processor module. Up to nineteen other modules are connected to the bus via connectors on the back of the modules; each one interfaces to the bus through a standard bus interface unit BIU card in the module. There are no restrictions on the mixture of modules on the bus or on the order in which they are connected.

A bus cycle is initiated from the bus control unit BCU. The identity of the selected module is placed on the bus in bits 1–8 (any of bits 5–8 may be omitted for module selection). The selected bus interface unit BIU responds with an acknowledgement signal.

The bus control unit BCU then generates further control signals to command the bus interface unit BIU to either accept data from the bus control unit BCU via the bus or to place data on the bus for the bus control unit BCU.

The complete cycle takes 1.8 microseconds plus the operating time of the device itself.

ADDITIONAL SUBSYSTEM DESCRIPTION

The Processor

The processor CPU is a 20 — bit 16 — accumulator parallel processor. It can perform arithmetic and a wide range of Boolean functions between accumulators. Its effective speed is 6 microseconds per instruction.

In addition to the basic minicomputer capabilities, this machine has three instructions which greatly enhance its capability in a telephone office environment:

a. The BYTE TEST instruction allows 1–4 bits in a word to be isolated, checked, and a decision made in one step. This function is commonly required in telephone-office service, and normally requires several separate instructions.
b. The BYTE SET instruction allows 1–4 bits in a word to be altered in one step while clearing the remaining bits or leaving them unaltered. This is another commonly encountered function which is quite cumbersome in most processors.
c. The SCAN instruction can be used to search a block of memory for a given set of contents at a rate of 10 microseconds per word. A major application is in searching the translation field in data base memory, which is normally addressed by directory number, in order to perform ANI.

Direct addressing of 4,096 program words is provided, with direct branching and indirect addressing to a total of 65,536 words. This far exceeds normal requirements.

The available instructions are as follows:

| Name | MNEMONIC | HEXADECIMAL CODE | |
|---|---|---|---|
| load | LDA | F | memory |
| compare | CMP | 1 | reference |
| mask (logical and) | MSK | 2 | instructions |
| Superimpose (logical or) | SUP | 3 | |
| Byte test | TST | 6 | byte-oriented, |
| Byte set | SET | 7 | accumulator- |
| | STZ | 7 | accumulator |
| Move | MOV | 80 | |
| Logical and | AND | 81 | |
| Add | ADD | 82 | arithmetic & |
| Increment | INC | 83 | logical |
| Inclusive or | IOR | 84 | accumulator- |
| Complement | COM | 85 | accumulator |
| Subtract | SUB | 86 | |
| Decrement | DEC | 87 | |
| Load acc. | LOD | 88 | |
| (indirect) | LOD + | 80 | peripheral data |
| | LOD − | 8C | handling |
| | LOD X | 8E | |
| Store | STR | 89 | + pre-increment |
| (indirect) | STR + | 8B | − pre-decrement |
| | STR − | 8D | X pre-index by contents |
| | STR X | 8F | of ac O |
| Scan for equal | SNE | 9 | |
| Scan for non-equal | SNN | 9 | |
| Rotate right | RTR | Ø8 | 1–16 places right |
| Add immediate | ADI | C | add a literal (1-4096) to an |
| BRANCH | BR | D | |
| Branch to subroutine | BRS | O | |
| Branch indirect | BRI | E | |

The Minicomputer Interface

This interface allows two Databuses to access the core memory of a Supernova computer. The computer can be made to "look like" program memory, data base memory, or other subsystems by appropriate programming. Up to four subsystems can be simulated at once.

The major application is in providing a readily changeable program memory for debugging. Software is available to simulate program memory and make alterations via the Supernova teletype terminal.

The Tape Drive Subsystem

This unit provides a large read-write file capability at the expense of access speed.

Capacity is 180,000 words and average access time is 12 seconds. If only part of the capacity is used, access time is shortened. Single words, or blocks of up to 100 words, may be brought into buffer storage on command from the Databus. Buffer storage is read via the Databus. Writing is accomplished by placing data in the buffer via the Databus, followed by the appropriate command.

Writing may be prevented by a local switch, or remotely.

The Data Channel Subsystem

This subsystem provides a group of ten CPS ASCII send and receive data channels. The basic subsystem can be used for the following:

a. Remote message printout
b. Remote or local keyboard inputs
c. Connection to remote units such as operator's consoles, etc. These units would contain encoders to send ASCII characters when keys are pressed, and stores and decoders to control lamp fields, etc. in response to ASCII signals.

The subsystem is packaged in an electronic module and an interface module. Up to eight input/output channel pairs may be provided using one electronic card and one interface card per channel pair.

SOFTWARE

The software for the system is divided into four categories:

Call Processing Programs

These are stored in the program memory and control the switching of calls and the sequence in which all events take place. The executive program controls all call processing by scanning or polling each subsystem looking for a call-for-service condition. If a call-for-service is located, the central processing unit branches out of the executive program into a service routine where the necessary processing is accomplished.

For example, a register having collected a digit will place a call-for-service. This will be detected by the central processing unit during execution of the executive program when it polls that register. The program will now leave the executive and branch to the register control program where the dialed digit will be examined, translations made, etc. When completed the program returns to the executive cycle at the point it originally left, and will poll the next register and so on.

A standard call processing software package which includes all normally used programs is provided with the machine. Certain additional programs providing extra features are available and may be ordered on an optional basis. Depending on the amount of free space left in the memory when the standard program has been loaded, these optional programs may or may not require additional MOSFET memory cards.

Figure 5:
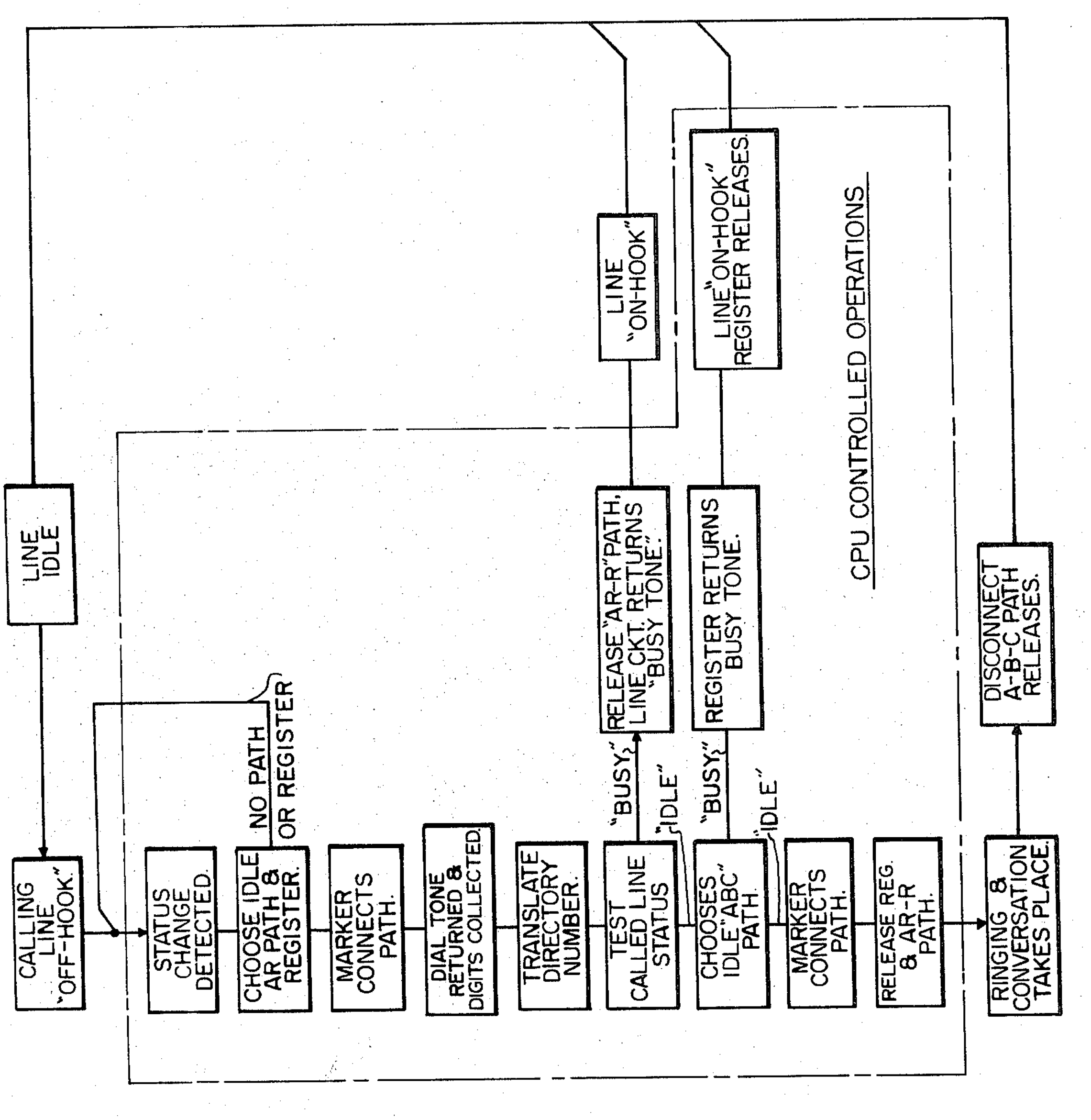
FIG. 5 is a flow chart showing system operation for a typical call.

FIG. 5 is a flow chart showing the basic call processing sequences for a typical local to local subscriber call.

Maintenance Programs

Maintenance programs are also stored in the program memory and provide for both periodic and manually requested routines to be executed which will check for proper operation of the machine, or print-out on the teletypewriter various data. One such program called the "Short Test Routine" is executed during each cycle of the executive program. If it is not executed correctly, a more intensive program called the "Extended Test Routine" is executed. This program loads information into registers and then reads it out and compares it to the original information. If any error is detected a printout results giving the location in the program where the error occurred. This information can then be used to determine which register is faulty, thus locating the trouble to a relatively small area of the machine.

Manually initiated maintenance programs are executed whenever pushbuttons on the console are operated and result in print-outs of memory information, traffic data, lines in lock-out states, etc.

A standard maintenance program package is provided with the machine.

Data Base Software

The data base is stored in the ring core data memory and consists of all directory to equipment number translations, the class of service assigned to each line, and tables of trunk groups routing information, etc.

Support Software

This software category is used to simplify the programming task, to maintain records of every office on a magnetic tape file, thus permitting any combination of features to be provided and changed on an individual office basis, and to produce the punched tapes required to load the program memory. This software is run on a regular commercial data processing computer.

If a call processing or maintenance program change is necessary to add a new feature or delete an existing feature, a revised tape is generated for reloading the MOSFET memory cards together with a printed list of the revised program.

CALL PROCESSING FOR SYSTEM S2

Call processing may be defined as being the utilization of a stored program by the central processor CPU resulting with various connections being established through the switching network.

The Stored Program

The stored program (MOSFET memory) which controls call processing in the system is actually a collection of programs. Separate programs are used to direct different phases of call processing: initial register connections, digit analysis, line-to-line connections, sender control, and so on. The various programs are coordinated by an executive program. This program directs the central processing unit CPU to "scan" all circuits which can initiate calls for service, to determine if any of them are calling for service. The central processing unit CPU scans the lines (via the status detector), the marker, the registers, and the senders. If any of these are calling for service, the central processing unit CPU branches into a "service" program, thus providing service to the calling equipment. In the absence of calls for service the central processing unit CPU remains in the executive program: scanning register, senders, markers, lines, the console control (for the presence of maintenance requests), and return to the start of scanning. This scanning continues repeatedly unitl a call for service is detected.

A call for service will cause the central processing unit CPU to branch into a service program of the appropriate type. At the conclusion of the service program the central processing unit CPU will branch back to the beginning of the executive program. This is of course a very much simplified description of the actual scanning cycle. Special routines and checks provide priority service to calls which cannot be delayed, such as the connection of an incoming trunk call from a non-stop-dial exchange and outgoing trunk traffic requiring interdigital switch-through.

A register calls the central processing unit CPU for service after the reception of each digit, or after a time-out (about 15 seconds without receiving a digit). The CPU checks to see if the register has sufficient digits to make a translation, if so, it proceeds to make the translation. A sender operates in a similar manner. It calls for service when it has sent all the stor digits, or when it times out. (Due to a stopdial signal from the distant office.) After the sender has sent all its stored digit, the central processing unit CPU may release the sender (if all the required digits have been sent) or it may provide the sender with more digits to send.

The marker calls the central processing unit CPU for service after the setting up of each connection. The central processing unit CPU checks the connection to ensure that the equipment involved has gone busy, indicating that the correct path has been pulled. A marker call for service indicates that the marker had just been idled and is available to make another connection.

Periodically an automatic test routine is initiated by the console control to check out the common control. The console control calls for service when this test routine is due. If this test routine fails, a system transfer occurs and a much more complex test routine is initiated, which gives an indication of the nature and location of the fault to the console control. The console control can then arrange to transfer to the standby equipment if necessary.

The line scanning procedure is abbreviated by means of wired logic in the status detector which is arranged to examine the status of from 4 to 48 lines simultaneously The number of lines being examined depends upon the number of line groups in an office. A signal is developed in the status detector if any line is calling for service in that group and will be detected by the central processing unit CPU as it examines the status detector. If no signal is present the central processing unit CPU will advance the status detector to examine the next group of lines. The second part of the line service program then consists of scanning the individual lines in that group to locate the specific line calling for service.

The maintenance console panel contains a number of switches by which various special programs can be selected. The final step in the executive program is to check these switches and determine if one of the programs is required at this time.

It is instructive to consider the way calls are handled by the hardware and software described above, therefore four types of calls will be considered: a local-to-local; a local-to-trunk call which is interdigitally switched; a local-to-trunk call which uses a sender; and an incoming non-stop-dial trunk call.

Local-to-Local Call

When a customer goes off-hook he closes the line loop to the central office. This operates the line relay in the local line circuit for this line, and the LLC (local line circuit) passes a signal to the status detector indicating the call for service.

In the course of the executive program, the central processing unit CPU will examine the status of all lines and will recognize the call for service. The central processing unit CPU branches into a line service routine and identifies the specific line in the group which is calling for service, again by interrogating the status detector. The central processing unit CPU refers to its data memory for the class of service details of this line, and determines that it is a local line using a standard dial and requiring dial tone as a start signal indication. The central processing unit CPU goes on to select an idle dial-pulse register, and to select a path through the AR and R stages of the network between the calling line and the selected register. The central processing unit CPU loads the details of the required connection into temporary storage in the marker via the Databus, and activates the marker. The central processing unit CPU loads an instruction into temporary storage in the register: "providing dial tone and collect one digit". The central processing unit CPU also loads the calling party's line equipment number into temporary storage in the register. This instruction and data are also loaded via the Databus. The central processing unit CPU branches to the executive cycle.

The marker calls for service to the central processing unit CPU to have the connection checked. After the check the central processing unit CPU once again returns to the executive program.

The customer receives dial tone from the register and dials his first digit. In some cases one digit may be sufficient to route the call. For example, 0 would indicate that an operator connection was required; 1 would indicate that a trunk to a toll center was required, and an office with interdigital switchthrough would route this call at this point. At any rate, after each digit is received the register calls the central processing unit CPU for service. The central processing unit CPU examines the digit to see if the call can be routed. If this is a local-to-local call, the first digit dialed will be the first digit of the local office code, and will not be sufficient to route. Three digits will be required before the decision to route can be made,.

After the third digit is received the central processing unit CPU determines that the three digits form the local office code. again, the central processing unit CPU returns to the executive program.

When the complete number has been received three offices code digits and (four station digits), the central processing unit CPU can route the call. First, however, the dialed directory number must be translated into a line equipment number on the network, and a ring code for that particular party on the line. The central processing unit CPU refers to a section of the data memory (the translation section) to obtain this information. Once it has located the called line equipment number, the central processing unit CPU can start looking for a path through the network. The line equipment number of the calling line was stored by the central processing unit CPU in the register when the register was first selected, so it can be retrieved by the central processing unit CPU for use at this point.

Using the calling and called line equipment numbers, the central processing unit CPU can select a network path involving an A switch, a B switch, and a C switch, plus one originating and one terminating junctor. The central processing unit CPU passes the details of the connection along the Databus to the marker. It also sends a command to the terminating junctor indicating that a transmission bridge is to be inserted, and indicating which ring code or frequency is to be used. The marker goes on to pull the path, and at the same time the central processing unit CPU instructs the register to release, dropping the existing network path from the calling line-to-register. As always, when the marker has pulled the path it calls the central processing unit CPU to check that the correct equipment has gone busy.

The connection is now complete, and since the register has released, the central processor has no connection with this call any more. The terminating junctor provides ringing current, ringback tone, ring trip, provides reverse battery supervision, and subsequently supervises the call for disconnect. The path is held by the terminating junctor, and can be released by the junctor without calling in the central processor.

Local-to-Trunk Call Without Senders

This type of call is processed in the same way as a local-to-local call up to the connection of a register and the receipt of the first digit. The call may be routed on the first digit, but in this example the call will be an EAS call in which routing will take place after third digit (office code).

After the first digit is received the register will call in the central processing unit CPU to analyze the digit. Analysis will show that at least three digits are needed to route the call, and the central processing unit CPU will instruct the register to collect two more digits.

After the third digit the register will call the central processing unit CPU. The central processing unit CPU will analyze the three digits and determine that they represent an office code available on EAS. The office code will be referred to the table section of the data memory, which will give a list of trunks which can be used to access this office. The central processing unit CPU will select an idle trunk from the group at random for use on this call, and will hunt for a network path from the calling line to this trunk. This will involve an A switch, a B switch, and a C switch, plus originating and terminating junctors. The central processing unit CPU loads the marker with details of the connection, including a command for the terminating junctor telling it to switch through metallically and not to ring. The marker operates this path, and the register drops out.

All the above happens during the interdigital pause. The line will be switched onto the trunk in time for the fourth digit to be dialed directly over the trunk into the distant office.

The local office is now completely disconnected from handling the call, other than conducting it through the network. The connection is supervised and held by the trunk circuit, not by the terminating junctor.

Local-to-Trunk Call with Senders

This type of call proceeds as a local-to-local call until sufficient digits are received to indicate that an outgoing trunk connection is required. At this point a sender is assigned to the call, a trunk is selected, and a connection is established between the two using an AR switch and an R switch. The sender immediately begins outpulsing. As further digits are received by the register they are transferred by the central processing unit CPU to the sender and outpulsed. Shortly after the sender-trunk connection is set up another connection is set up from the calling line (which is still connected to the register) to the trunk (which is still connected to the sender). The terminating junctor keeps the transmission path between line and trunk open until signaling is completed.

When all digits have been received by the register and transferred to the sender, the register remains attached to the line. Only when all digits have been sent is the register released, together with the sender. The central processing unit CPU calls in the marker to pass the command to the terminating junctor in the line-to-trunk connection telling it to provide metallic switch-through. As before, the junctor does not hold the connection, the trunk circuit holds it.

Incoming Non-stop Dial Trunk Call

The only difference between this type of call and a regular local-to-local call is in the connection of a register. Non-stop dial trunks must be connected to a register during the interdigital pause. In order to insure that no pulses are lost from the time a register is ready to receive pulses a technique known as pulse-bypass method is used by the system.

All incoming non-stop dial trunks are connected to a special incoming trunk adapter called a pulse-bypass adapter. This adapter is able to absorb the first pulse of the first digit and via the positive side of the line and the register signal the central processing unit CPU to add one count to the registor's dial pulse counter. In order to insure that a register will be idle, a special pool of registers are dedicated to this type of trunk call. If all registers in the special pool are busy the central processing unit CPU will allow a call to overflow into the other group of registers which are normally used by the local-to-local calls. In this way the probability of no idle register being available is very low. When a non-stop dial trunk calls for service it is identified by the service treatment data stored in the data memory. The central processing unit on observiing the type of trunk selects a register from the special pool and notifies it to accept the special signals from the pulse-bypass adapter.

From hereon the call is handled as a regular call. The register is instructed to collect an appropriate number of digits, but does not supply dial tone.

ELECTRONIC COMPONENTS

The integrated circuits are of the 7400 series. The power supplied thereto is +5 volts from D.C. to D.C. converters, and electronic ground. A voltage level of at least 2.4 volts is designated as logical 1, true, or high as synonomous terms; while a voltage level between 0.4 volts and ground is designated as the logical 0, false, or low. Several types of integrated circuit chips of the 7400 series are used in the System S2. Those used in the bus control unit BCU and bus interface units BIU include gates on chips of type 7400, 7401, 7402, 7420, 7438, 7440, and 7451; and inverters 7404. Equivalent logic is shown on the drawings by symbols of half-moon shape, with a line parallel to the base for the AND function, a diagonal line for the OR function, and a small circle or dot at inputs and outputs for the invert function. Gates used for loading control, etc. are not shown. In Boolean equations, the dot or blank space is used for the AND function, a plus sign for the OR function, and overlining for the invert function. Overlining of the left side of an equation indicates that the signal is effective one 0.

Flip-flops have PRE and CLR inputs, in which 0 thereat sets and resets the circuit respectively. The set state is defined as a 1 at output Q and a zero at output $\overline{Q}$, while reset is the opposite state.

Flip-flops of the D type 7474 are triggered by a positive going transition at the clock input C to set or reset at that time for 1 or 0 respectively at input D.

Flip-flops of the J-K type 7476 are triggered by a clock pulse at input C to be primed on the leading edge, and to change the output on the trailing edge of a positive pulse; setting it for 1 at J and 0 at K, resetting it for 0 at J and 1 at K, changing the state for 1 at both J and K, and no change for 0 at both J and K.

A retriggerable monostable type 74123 has a CLR input effective on 0, and T1 and T2 inputs for a resistance-capacitance-diode network to determine its time constant. It is triggered by a negative-going transition at input A if input B is 1, or a positive-going transition at B if A is a 0. With either, the output becomes 1 at the time of the trigger, and goes back to 0 at the end of the time determined by the circuit at T1–T2. A 1 at A or a 0 at B keeps the circuit reset.

While the System S2 uses latches on chips such as 7475, it also makes use of two NAND gates in a latch configuration, each having its output connected to an input of the other. The other inputs are normally at 1, these inputs being designated in equations at ($\overline{\text{SET}}$) and (RESET) for the respective gates, since a 0 thereat determines the state.

Multiplexer chips type 74150, 74153 and 74157 are also used.

BUS CONTROL UNIT BCU

Figure 6:
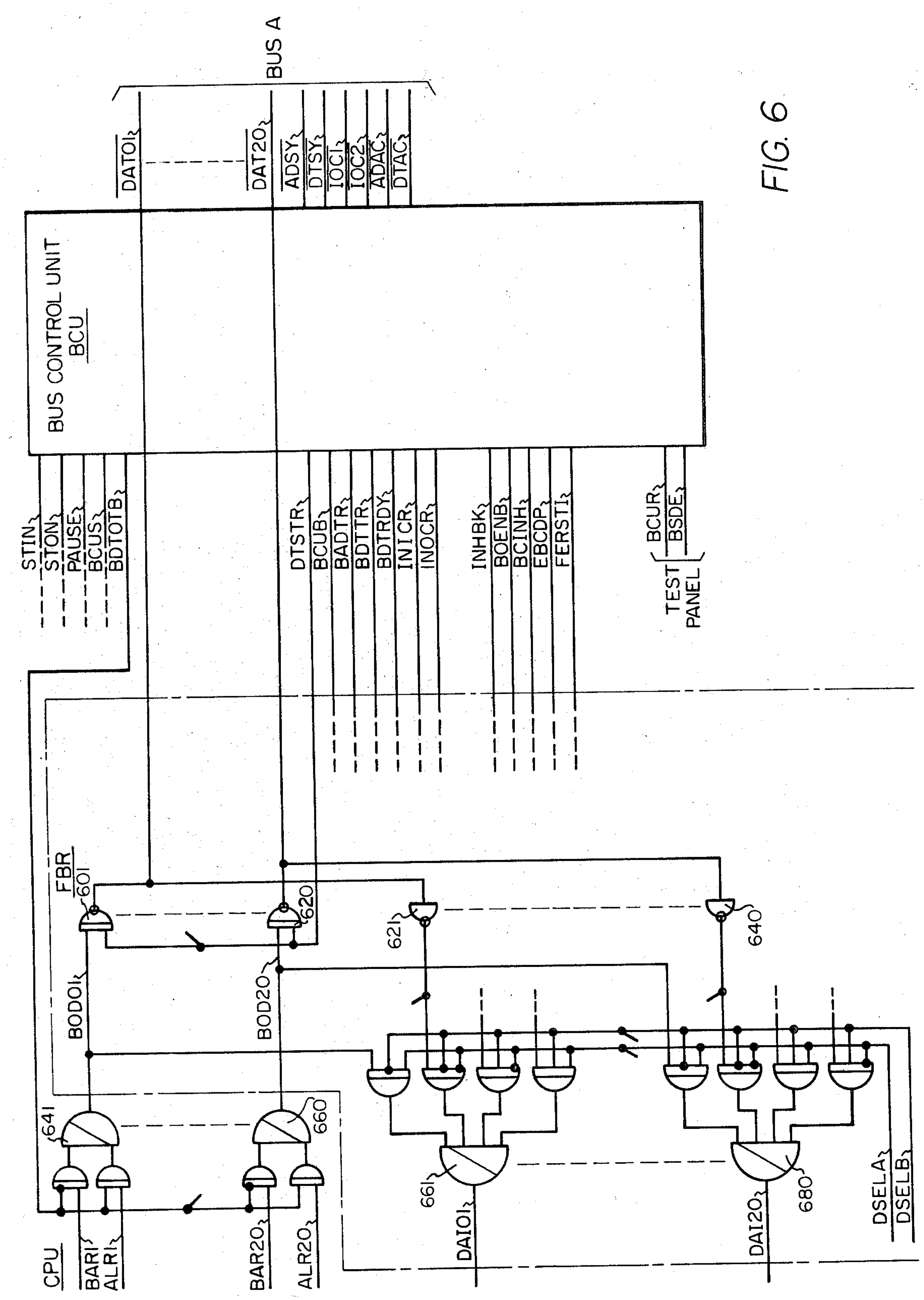
FIG. 6 is a block diagram showing the bus control unit, and a functional block diagram of a portion of the central processing unit and fault buffer.

The bus control unit BCU is shown as a single block in FIG. 6, along with a portion of the central processing unit CPU and fault buffer FBR showing corrections to the 20 conductors $\overline{\text{DAT01}}$–$\overline{\text{DAT20}}$ of the Databus (busA). Driver gates 601–621 when enabled by signal DTSTR from the bus control unit BCU couple signals at high level from the 20 leads BODO1–BOD20 to low level on the bus. The driver gates 601–621 are on chip type 7438, which have open collector, high power outputs. The Databus conductors DAT01–DAT20 are also connected to inverter receivers 621–640. The signals on leads BOD01–BOD20 are supplied via a multiplexer circuit on five chips, shown by equivalent logic OR gates 641–660 with associated AND gates. A signal on lead DTOTB when low selects address inputs BAR-1–BAR20, and when high selects data inputs ALR-1–ALR20. Another set of multiplexer chips shown by OR gates 661-680 with associated AND gates couples received signals to data in leads DAI01–DAI20, when the signals on control leads $\overline{\text{DSELA}}$ and $\overline{\text{DSELB}}$ are both low. Note that conductors $\overline{\text{DAT01}}$–$\overline{\text{DAT20}}$ are connected through connectors on the bus control unit card BCU to the bus.

The six control conductors or the bus include four from the bus control unit which are driven by gates type 7440, with inputs and outputs of the two gates on a chip in parallel.

The circuits of the bus control unit BCU are described below in the form of Boolean equations. The definitions of the signals are as follows:

| | |
|---|---|
| BUC to the bus | |
| ADSY | Address sync |
| DTSY | Data sync |
| IOC1 | Address is on bus - also used for data out |
| IOC2 | Data on bus - in or out |
| Bus to BCU | |
| ADAC | Address acknowledge |
| DTAC | Data acknowledge |
| CPU to BCU | |
| STIN | Start a data in cycle |
| STOT | Start a data out cycle |
| STOT | |
| BCU to CPU | |
| DTOTB | Enable the address/data multiplexer to place data on the bus output data lines |
| CPUCK | CPU clock 50 ns on, 150 ns off |
| BCUS | Bus control strobe for data |
| PAUSE | A bus occupied signal used on processor to halt the time slot counter |
| Test panel to BCU | |
| BCUR | Bus reset switch contact |
| BSDE | Bus sequence detector disable switch contact |
| BCU to FBR | |
| BCUB | Bus control unit busy |

| | |
|---|---|
| BADTR | Buss address true. The address in the BAR is stable and usable. |
| SYSCK | 10HMZ system clock square wave |
| BDTTR | Bus data true. The data on the bus is now usable. |
| BDTRDY | The data has just appeared on the bus |
| INICR | initial condition of input control signals |
| INOCR | Initial condition of output control signals |
| DTSTR | Data strobe; a gating signal enabling the bus drivers. |
| FBR to BCU | |
| INHBK Inhibit bus start sequence | |
| BOENB | An external enabling signal to generate DTOTB |
| BCINH | Control lead inhibit (inhibits $\overline{\text{IOC1, IOC2, DTSY, ADSY}}$) |
| EBCDP | External bus control done pulse, an external reset to PAUSE |
| FERST1 | Error reset signal |
| FBSTR | Data strobe generated by fault buffer |
| BCU internal signals | |
| STOTIN | STIN + STOT |
| BMPTR | Clock date out (DTOM) main or data in (DTIM) main to DTOB or BTIB. Main to buffer transfer |
| BEDTC | End of data cycle |
| BCURT | Bus control unit reset |
| BCENB | Bux control unit enable. Allow bus control unit timing to start |
| BUCUCK | Bus control unit clock. 10 MHZ square wave |
| BEADC | End of address cycle |
| BADCY | Bus address cycle state |
| BDTCY | Bus data cycle state |
| BATSO | Address time sequence counter |
| 1 | |
| 2 | |
| 3 | |
| BDTS0 | Data time sequence ounter |
| 1 | |
| 2 | |
| 3 | |
| 4 | |
| BPARS | Pause reset |
| BROSTR | Data out strobe |
| BADSTR | Address strobe |
| BADSYI | Bus address syrc internal. Same signal as ADSY but used internally on BCU card. |
| BDTSYI | Bus data sync internal. Same signal as DTSY but used internaly on BCU card |
| BAERC | Bus address error continue. (Generated if ADAC not received with 12 microseconds of ADSY) |
| BDERC | Bus data error continue. (Generated if DTAC not received within 48 microseconds of DTSY) |
| BSENF | Bus sequence enabled flag |
| BSATM | Bus sequence address timer |
| BSAEF | Bus sequence address error flat |
| BSACFS | Bus sequence address cycle failed |
| BSDTM | Bus sequence data timer |
| BSDEF | Bus sequence data error flag |
| BSBCFS | Bus sequence data cycle failed |

The bus control unit includes the clock circuits for itself and the central processing unit CPU. It comprises a 10 megahertz oscillator and a plurality of gates. The clock output for the bus control unit on lead BCUCK is a square wave 50 nanoseconds high and 50 nanoseconds low. A signal on lead SYSCK to the fault buffer FBR has the same square wave and timing. A signal on lead CPUCK to the central processing unit has a timing of 50 nanoseconds high and 150 nanoseconds low.

A timing circuit comprises three JK flip-flops BCFFA, BCFFB and BCFFC with logic as follows:

Inputs to flip-flops
Clock is BCUCK
BCFFA(J) = STOTIN
B(J) = BCFFA
C(J) = BCFFB
A11 (K) = BCFFC
A11 (PRE) = 1
A11 $\overline{\mathrm{CLR}}$ = BCUB + BCURT + $\overline{\mathrm{INHBK}}$
Output
BADTR = BCUCK BCFFA BCFFB $\overline{\mathrm{BCFFC}}$
BCENB = BCFFC INHBK The bus address timing sequence is controlled by four JK flip-flops BATSO, BATS1, BATS2 and BATS3 with logic as follows:

Inputs to flip-flops
Clock is BCUCK
BATSO(J) = BCENB
1(J) = BATSO
2(J) = BATS1
3(J) = BATS2 $\overline{\mathrm{BADCY}}$ (ADAC + BAERC)
0,1(K) = BATS3
2(K) = BEADC
3(K) = $\overline{\mathrm{BATS3(J)}}$
A11 (PRE) = 1
A11 ($\overline{\mathrm{CLR}}$) = BCURT
Outputs
BATSO
BADCY = $\overline{\mathrm{BATSO}}$ $\overline{\mathrm{BATS1}}$ $\overline{\mathrm{BATS2}}$ $\overline{\mathrm{BATS3}}$
ADSY = $\overline{\mathrm{BCINH}}$ BATSO BATS2 $\overline{\mathrm{BATS3}}$
BADSYI = BATSO BATS1 BATS2 $\overline{\mathrm{BATS3}}$
BMBTR = BATS1 BATS2 $\overline{\mathrm{BATS3}}$
BEADC = $\overline{\mathrm{BATS0}}$ $\overline{\mathrm{BATS1}}$ BATS2 $\overline{\mathrm{BATS3}}$
BADSTR = BATS0 BDTCY The bus data timing sequence is controlled by five JK flip-flops BDTSO, BDTS1, BDTS2, BDTS3 and BDTS4 with logic as follows:

C. BUS DATA TIMING SLOTS
Five JK flip-flops BDTS0, 1, 2, 3, 4.
Inputs to flip-flops
Clock is BCUCK
BDTSO(J) = BEADC
1(J) = BDTS1
2(J) = BDTS1 $\overline{\mathrm{BDTCY}}$ (DTAC + BDERC)
3(J) = BDTS2 $\overline{\mathrm{BDTS4}}$
4(J) = BDTS3
0(K) = $\overline{\mathrm{BDTS3}}$ BDTS4
1, 4(K) = BEDTC
2(K) = $\overline{\mathrm{BDTS2(J)}}$
3(K) = BDTS4
A11 (PRE) = 1
A11 ($\overline{\mathrm{CLR}}$) = BCURT
Outputs
BDTS0 etc.
BDTTR = BCUCK BDTS3 BDTS4
BPARS = $\overline{\mathrm{BDTS3}}$ BDTS4
DTSY = $\overline{\mathrm{BCINH}}$ $\overline{\mathrm{BPARS}}$ BDTS0 BDTS1
BDTCY = $\overline{\mathrm{BDTS0}}$ $\overline{\mathrm{BDTS1}}$ $\overline{\mathrm{BDTS2}}$
BEDTC = $\overline{\mathrm{BDTS0}}$ BDTS1 BDTS2
BDOSTR = BDTS0 DTOB
BDTSYI = $\overline{\mathrm{BPARS}}$ BDTS0 BDTS1

A bus control unit BU Y and RESET
JK flip-flop BCUB has logic:
Inputs
Clock is BCUCK
BCUB(J) = BCENB
(K) = BEDTC
(PRE) = 1
($\overline{\mathrm{CLR}}$) = BCURT
Output
BCUB Two BCU reset JK flip-flops BCUR0, BCUR1 have logic:
Inputs
PRE and CLR for both = 1
Clock is BCUCK
BCUR0(J) = BCUR
(K) = $\overline{\mathrm{BCUR}}$
BCUR1(J) = BCUR0
(K) = $\overline{\mathrm{BCURO}}$
Output
BCURT = BCUR0 $\overline{\mathrm{BCUR1}}$ Four JK flip-flops DTOM, DTOB, DTIM, DTIB for data out main and buffer, and data in main and buffer have logic:
Inputs to flip-flops
Clock is (BMBTR + BEDTC)
DTOM($\overline{\mathrm{PRE}}$) = STOT
(J) = $\overline{0}$
(K) = $\overline{1}$
DTOB(PRE) = 1
(J) = DTOM
(K) = $\overline{\mathrm{DTOM}}$
DTIM($\overline{\mathrm{PRE}}$) = STIN
(J) = 0
(K) = 7
DTIB(PRE) = 1
(J) = DTIM
(K) = $\overline{\mathrm{DTIM}}$
A11 ($\overline{\mathrm{CLR}}$) = BCURT + $\overline{\mathrm{INHBK}}$
Outputs
DTOB
DTIB
BDTOTB = DTOB = BOENB One flip-flop PAUSE for a bus occupied signal used by the central processing unit to halt the time slot counter has logic:
Inputs
Clock is BCUCK
(J) = STOTIN
(K) = BPARS + EBCDP
(PRE) = 1
($\overline{\mathrm{CLR}}$) = BCURT
Other bus control unit outputs are:
INICR = DTAC + ADAC
INOCR = IOC1 + IOC2 + DTSY + ADSY
IOC1 = $\overline{\mathrm{BCINH}}$ (BDOSTR + BADSTR)
IOC2 = $\overline{\mathrm{BCINH}}$ BDTSO BADCY
BCUS = FBSTR + (BCUCK DTIB BDTS3 BDTS4)
DTSTR = BDOSTR + BADSTR A section of the bus control unit BCU card has fault buffering error control circuits comprising JK flip-flops, monstable circuits, latches comprising two NAND gates, and gate circuits with logic as follows:
Flip-flop BSENF
Inputs
($\overline{\mathrm{PRE}}$) = $\overline{\mathrm{BSENF}}$ (BSATM + BSAEF + BSDTM + BSDEF)
(J) = $\overline{\mathrm{BSDE}}$
(C) = BDENB
(K) = BSDE
($\overline{\mathrm{CLR}}$) = BCURT
MONO BSATM
(A) = $\overline{\mathrm{BADSYI}}$
(B) = BSENF ($\overline{CLR}$) = BCURT + $\overline{BSENF}$ (BSATM + BSAEF) + BEDTC
T1–T2 = for 12 microseconds
Flip-flop BSAEF
($\overline{PRE}$) = $\overline{BSENF}$ (BSATM + BSAEF)
(D) = $\overline{BADCY}$
C = BSATM
($\overline{CLR}$) = BCURT + BEADC
Latch (2NAND's) BSACFS
($\overline{Set}$ = BSAEF $\overline{BSATM}$ BSENF
($\overline{Reset}$) = FERST1
Outputs
BSACFE
BAERC = BSACFS BADSYI
Mono BSDTM
(A) = $\overline{BDTS1}$
(B) = BSENF
($\overline{CLR}$) = BCURT + BEDTC + [$\overline{BSENF}$ (BSDTM + BSDEF)]
(T1–T2) = 48 microseconds
Flip-flop BSDEF
($\overline{PRE}$) = BSENF + ($\overline{BSDTM}$ $\overline{BSDEF}$)
D = $\overline{BDTCY}$
C = BSDTM
($\overline{CLR}$) = BCURT + $\overline{PAUSE}$
Latch (2NAND's) BSDCFS
($\overline{Set}$) = BSENF $\overline{BSDTM}$ BSDEF
($\overline{Reset}$) = FERST1
Outputs
BSDCFS
BDERC = BSDCFS BDTSYI

BUS INTERFACE UNIT

Figure 7:
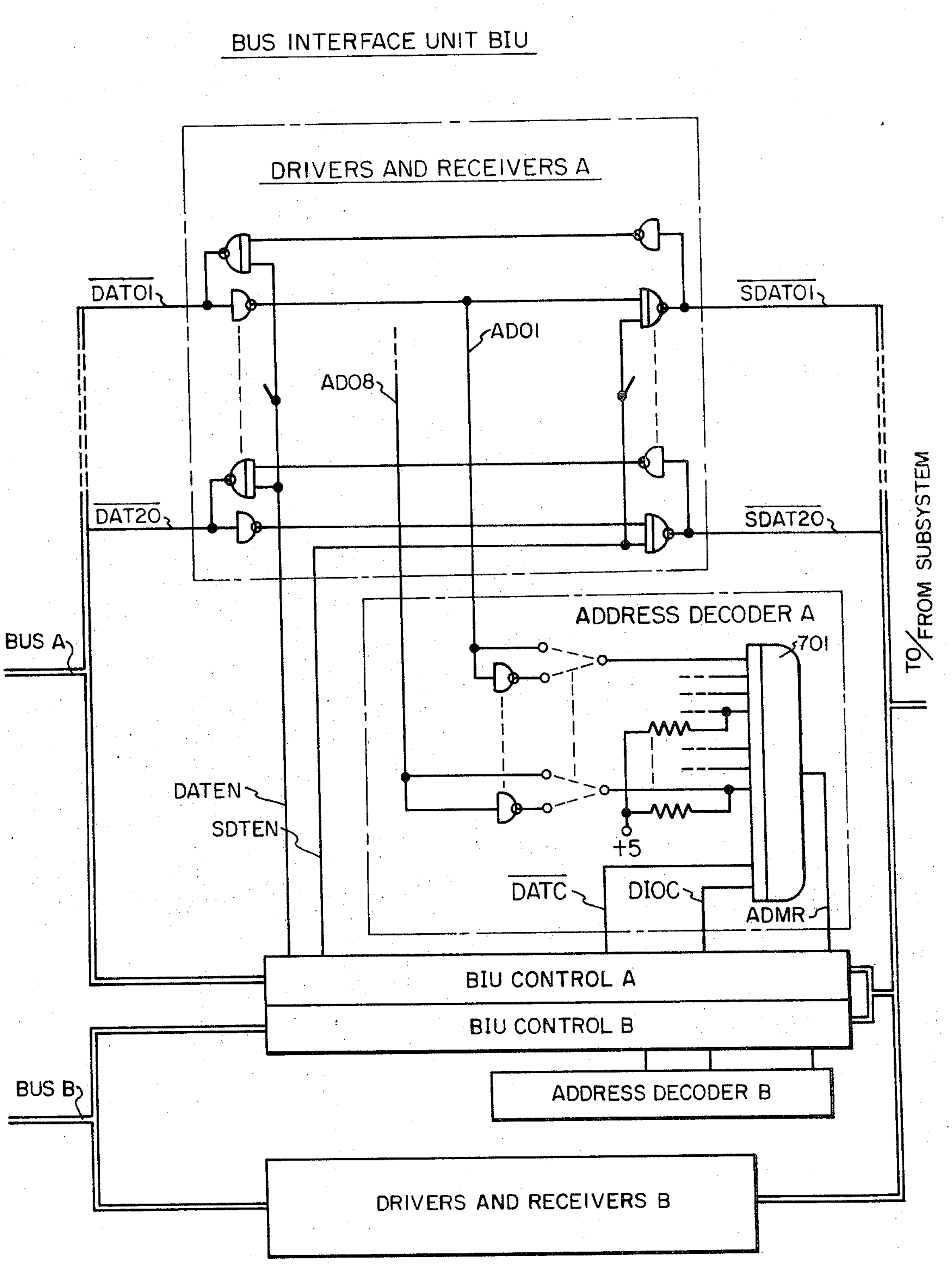
FIG. 7 is a functional block diagram of a bus interface unit.
Figure 8:
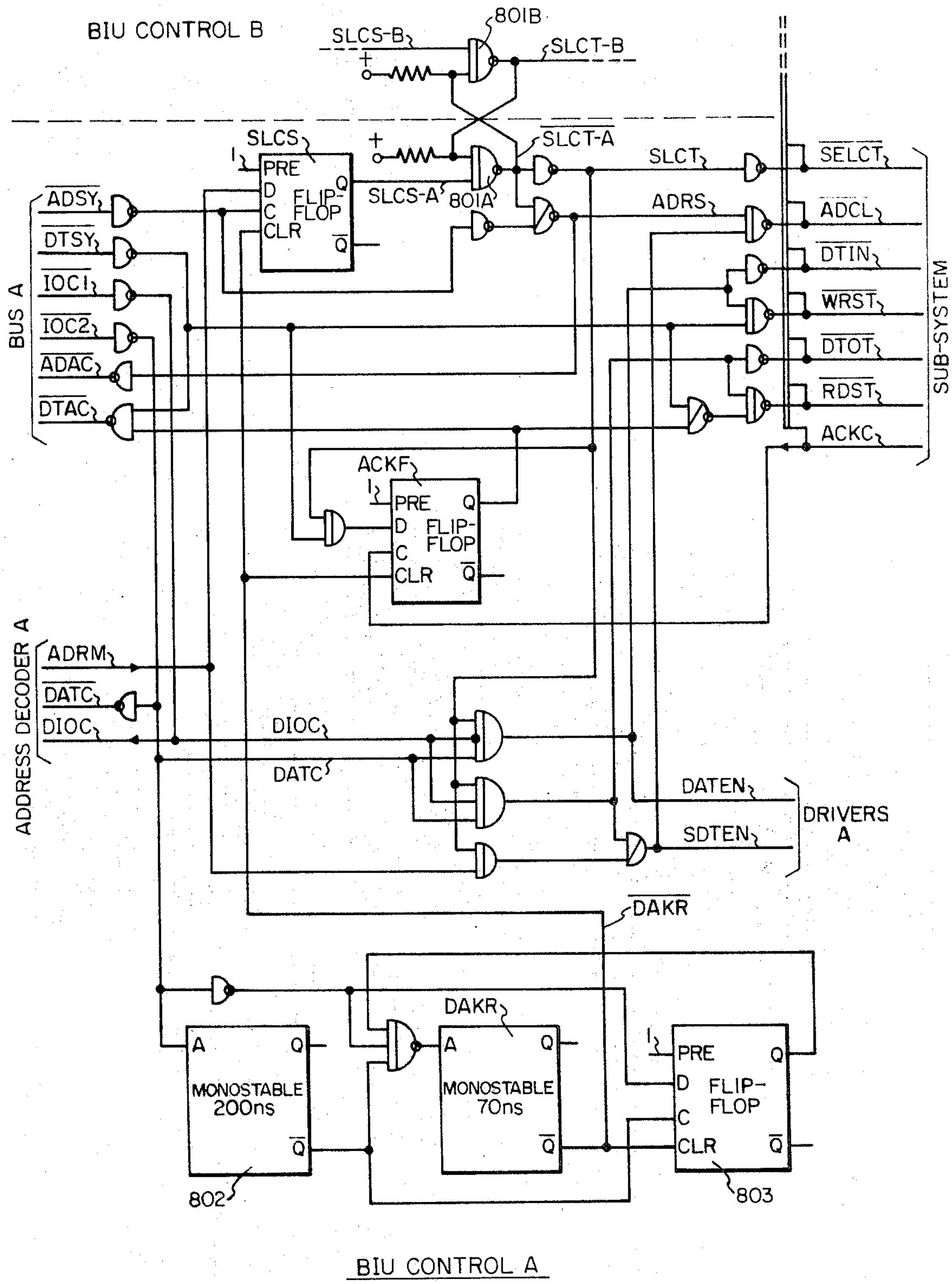
FIG. 8 is a functional block diagram of the control portion of the bus interface unit of FIG. 7.

A bus interface unit is shown in FIG. 7, with the control portion shown in further detail in FIG. 8. The conductors $\overline{DAT01–DAT20}$ are coupled to conductors $\overline{SDAT01}$ $\overline{SDAT20}$ by a set of drivers followed by receivers in each direction of transmission. There are duplicate circuits on the card for BUS A and BUS B. All of the leads to and from the associated subsystem are connected in multiple to the two duplicated parts. The subsystem end of the cable also has drivers and receivers.

For address detection eight of the leads AD01–AD08 following the receiver inverters from the bus are connected to an address decoder. The AND gate 701 shown in the drawing actually comprises two NAND gates for bits 1–4 and 5–8 followed by a NOR gate whose output is lead ADMR. For each of the eight bits the card has a triangle of three terminal points. For example lead AD01 is connected directly to one point, via an inverter to a second, and the third point is a gate input. A jumper is soldered from the gate input terminal point to one of the others depending on whether the bit value for the address is 1 or 0. For each of bits 5–8 the jumper may be omitted for a "don't care" condition, the gate inputs having resistors to +5 volts to provide a 1 for each. Thus the address for selecting a bus interface unit may comprise 4, 5, 6, 7 or 8 bits. Note that all 20 bits of the address are also supplied to the subsystem for storage in an address register.

As shown in FIG. 8, each of the duplicated control portions includes a selection D type flip-flop SLCS, half of a lockout latch comprising gates 801 A and 801 B, and an acknowledge D type flip-flop ACKF. A circuit comprising monostables 802 and DAKR, and a D type flip-flop 803 provide a signal on lead DAKR to reset the half of the bus interface unit to idle in response to the signal on lead DATC going low. This circuit also absorbs noise pulses on the bus conductor $\overline{T0C2}$ to lead DATC.

BUS ORGANIZATION

The Databus organization is shown on the drawings as BUS A and BUS B. The bus control unit BCU and bus interface units connect in parallel to the Databus, with BUS A and BUS B being separate 61-wire flat ribbon-like Mylar insulated cables. Signals are transmitted on 26 wires, the remaining wires being ground or +5 volts. Each end of each bus is terminated with each signal conductor connected to two resistors to ground and +5 volts respectively. The busses are plugged in separately to the two halves of each bus interface unit. Bus interface units which connect to only one bus have a terminator plugged into the other half.

BUS OPERATION

Figure 9:
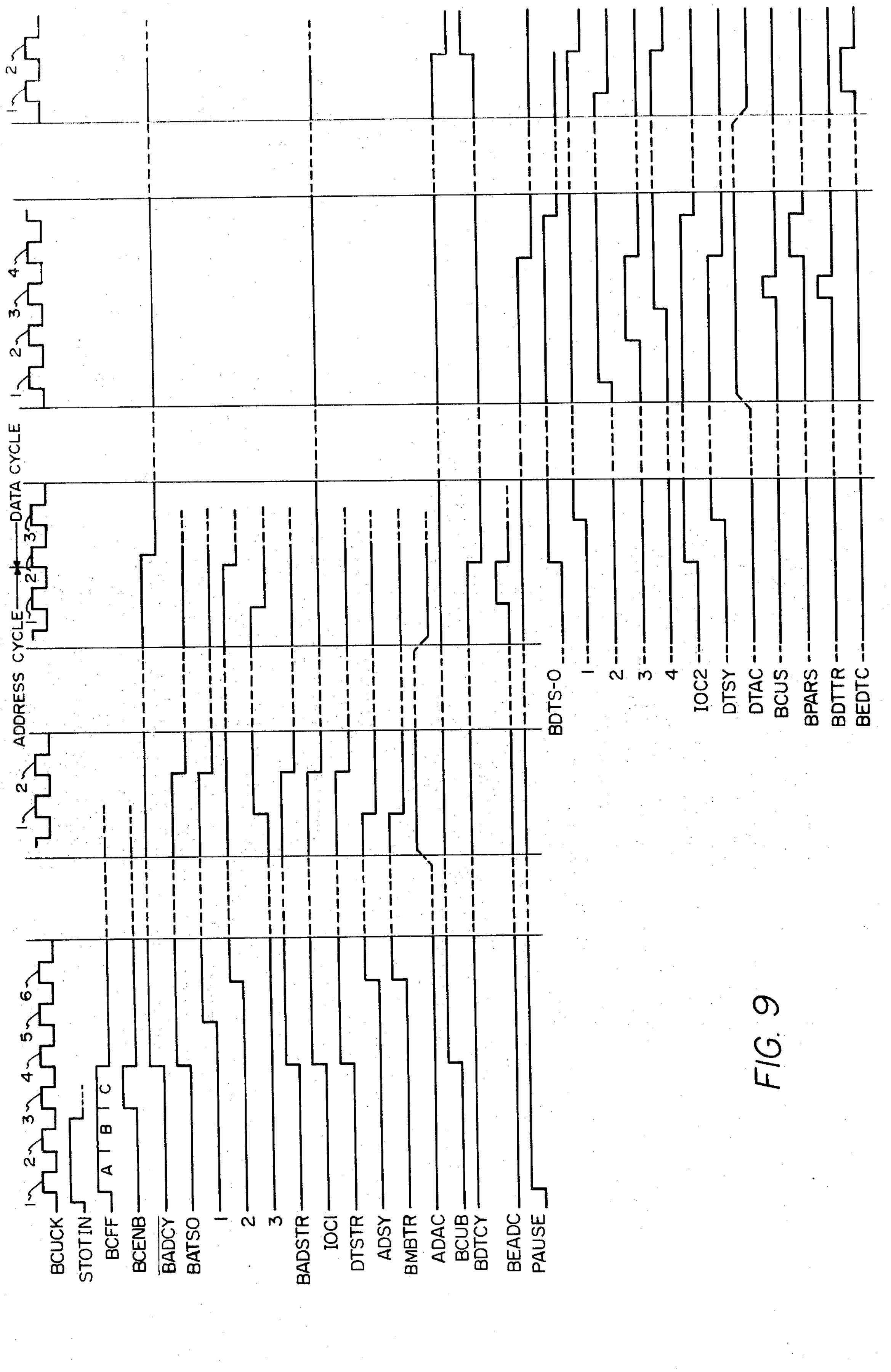
FIG. 9 is a timing chart of the operation of the bus control unit.

The operation of the bus will be described first for a data in operation, in which data is received from a selected subsystem and supplied to the central processor. FIG. 9 is a timing chart for this operation To initiate this operation the central processing unit supplies a signal STIN having a duration of 100 to 200 nanoseconds. This signal is supplied in inverted form $\overline{STIN}$ at the preset input of flip-flop DTIM to thereby set it. The signal is also supplied as an input along with signal STOT to a gate providing the OR function (STIN + STOT) to lead STOTIN which is connected to the J input of flip-flop BCFFA, and also to the J input of flip-flop PAUSE.

The first clock pulse on lead BCUCK sets flip-flops BCFFA and PAUSE. The output Q of flip-flop BCFFA is connected to the input J of BCFFB.

The second clock pulse sets BDFFB. The output Q of BCFFB is connected to the input J of flip-flop BCFFC. With BCFFA and BCFFB high and BCFFC low the signal on lead BADTR is high for 50 nanoseconds during the clock pulse. This signal indicates that the bus address is true; and that the address in the bus address register is stable and usable.

The third clock pulse sets flip-flop BCFFC. The bus control unit enable signal BCENB becomes true for one clock cycle, which enables the bus control unit timing sequences to start. This signal is supplied to the input J of flip-flops BATSO and BCUB. The output Q of BCFFC is connected to the input K of all of the BCFF flip-flops.

The fourth clock pulse sets flip-flops BATSO and BCUB, which respectively start the address cycle and indicate the bus control unit busy. The signal on lead BADCY goes low as long as any of the BATS flip-flops are set. An address strobe signal BADSTR in turn causes the signals IOC1 and DTSTR to become true. The signal IOC1 is supplied in inverted form via the bus to all of the bus interface units, and the signal DTSTR is used to enable bus drivers gating information on to the 20 data leads of the bus in inverted form.

The above operation has caused the bus control unit to place the address on the data lines and to assert the signal 10C1.

The fifth clock pulse sets the flip-flop BATS1, the output Q of BATSO being connected to the input of BATS1.

The sixth clock pulse sets flip-flop BATS2, the output Q of BATS1 being connected to the input J of BATS2.

This causes the signals ADSY and BADSYI to become true. Signal ADSY is the address signal supplied in inverted form to the bus, and BADSYI is the same sync signal used internally in the bus control unit. A signal BMBTR also becomes true to clock the flip-flops DTIM and DTIB, which resets flip-flops DTIM and sets flip-flop DTIB, flip-flop DTIM having its input K permanently at 1, and flip-flop DTIB having its input J connected to the output Q of DTIM.

The bus control unit has now waited 200 nanoseconds after asserting 10C1, and has asserted ADSY.

In the bus interface units, the signal 10C1 via an inverter receiver is designated DIOC. This signal along with the signal $\overline{DATC}$ is supplied to the address decoders. In the selected bus interface unit the address decoder provides a signal ADRM, which is supplied to input D of flip-flop SLCS.

The signal ADSY received via an inverter receiver 200 nanoseconds later is supplied to input C of SLCS to set it. The output Q of SLCS is connected as an input to an NAND gate which is one half of a special latch circuit along with a similar NAND gate in the section B of the bus interface unit. Normally the outputs of both of these gates of the latch are high, and when one half of the unit is selected the output of its NAND gate becomes low which inhibits the NAND gate in the other section. Thus this latch acts as a lock-out control so only one half of the bus interface unit may be busy at a time. The output of the NAND gate is supplied by an inverter to lead SLCT, which is again inverted and supplied to the subsystem as inverted signal SELCT. The signals SLCT and ADSY both true makes a signal ADRS true, which in turn is supplied by an inverter driver to provide the inverted signal ADAC via the bus as an acknowledgement signal to the bus control unit. The signal on lead ADRM from the address decoder along with SLCT being true makes the signal SDTEN true which enables the drivers to couple the data from the bus to the subsystem. This signal along with ADRS also makes the inverted signal on ADCL to the subsystem true, which may be used as a clocking signal to store the address.

If at the time flip-flop SLCS is set, the section B of the bus interface unit is busy as indicated by the signal on lead $\overline{SLCT\text{-}B}$ being low, section A will simply wait until the B section has completed its operation and has become idle, and then when the signal on lead $\overline{SLCT\text{-}B}$ again becomes high section A may proceed with its operation, at which time it supplies the address acknowledgement ADAC to the bus control unit, and supplies the various signals to its subsystem.

In the bus control unit the acknowledgement signal ADAC is received, which normally follows its assertion of ADSY by the propagation time on the bus, through the logic of the bus interface unit including setting of the flip-flop SLSC, and returning on the bus. If the bus interface unit has to wait for section B to become idle the time will be a little longer, but well within acceptable limits. The signal condition (ADAC BATS2 $\overline{BADCY}$) enables input J of flip-flop BATS3.

The first clock pulse thereafter sets BATS3. This causes the signals ADSY, BADSYI, and BMBTR to go low. Signal $\overline{ADSY}$ on the bus therefore goes high.

The second clock pulse resets flip-flops BATS0 and BATS1, which have the output of BATS3 connected to their K inputs. This causes signals BADSTR, IOC1, and DTSTR to go low, and consequently the signal $\overline{IOC1}$ on the bus to go high.

Thus the bus control unit after seeing ADAC has removed ADSY, waited 100 nanoseconds and removed the address and IOC1.

In the bus interface unit when ADSY drops, ADAC is removed from the bus. The bus interface unit then waits for IOC1 to drop, and in response thereto this signal ADRM drops, which removes SDTEN, and thereby inhibits the drivers so that the address is removed from the data lines SDAT01-20.

In the bus control unit, when ADAC drops, at flip-flop BATS3 input K, which is the inverse of the signal to input J, becomes true.

The first clock pulse following ADAC dropping resets flip-flop BATS3. At this time flip-flop BATS2 is still set, and the other BATS flip-flops have been reset, which produces a signal BEADC indicating end of the address cycle. This signal is supplied to input K of BATS2, and to input J of the first data cycle sequence control flip-flop BDTS0

The next clock pulse thus resets BATS2, which ends the address cycle.

Data Cycle

This same clock pulse sets flip-flop BDTS0. This causes the signal IOC2 to become true, which is supplied inverted to the bus.

The third clock pulse after ADAC has dropped sets flip-flop BDTS1, which has its J input connected to the output of BDTS0 With flip-flops BDTS0 and BDTS1 set, the signals DTSY and BDTSYI become true, the signal DTSY inverted is supplied to the bus.

Thus the bus control unit for the start of the data cycle has asserted signal IOC2, and after 100 nanoseconds has asserted DTSY.

In the bus interface unit the signal IOC2 as received is designated DATC. Since this is a data in operation, the signal DIOC received from the bus conductor IOC1 is false. The signal condition (SLCT $\overline{DIOC}$ DATC) provides the signal DATEN, which enables the drivers from the subsystem to supply data to the bus conductors.

The signal DTIN is also supplied inverted to the subsystem to inform it that this is a data in cycle. When DTSY is received, this causes the signal WRST inverted to be supplied to the subsystem indicating that it should place its data on the SDAT lines. The subsystem acknowledges by supplying the signal ACKC which is connected to the clock input of flip-flop ACKF. This flip-flop has had its input D enabled in response to the signal condition (DTSY SLCT), and therefore is set in response to the clock pulse. The output of the flip-flop in conjunction with the signal DTSY enables the driver to supply the signal DTAC inverted to the bus.

In the bus control unit, the signal DTAC in coincidence with BDTS1 and $\overline{BDTCY}$ via a set of gates supplies a signal to enable the J input and inhibit the K input of flip-flop BDTS2.

The first clock pulse after DTAC is received from the but sets flip-flop BDTS2.

The second clock pulse sets flip-flop BDTS3, which has its J input enabled in response to the signal condition (BDTS2 $\overline{BDTS4}$).

The third clock pulse sets flip-flop BDTS4, which has its J input connected to the output of BDTS3. With the flip-flops BDTS3 and BDTS4 set, the signal DTIB during the 50 nanoseconds of the clock pulse provides a signal BCUS which is supplied to the processor as a bus control strobe for data.

The fourth clock pulse resets BDTS3, which has its input K connected to the output of BDTS4. A signal $\overline{BPARS}$ becomes true in response to the condition ($\overline{BDTS3}$ BDTS4). The signal DTSY is inhibited by BPARS.

The signal BPARS via a gate enables the K input of flip-flop PAUSE; and the signal condition ($\overline{BDTS3}$ and BDTS4) also enables the J input of flip-flop BDTS0.

The fifth clock pulse resets flip-flops BDTS0 and PAUSE. With BDTS0 reset the signal IOC2 becomes false.

Thus the bus control unit in response to DTAC from the bus has removed DTSY and has strobbed the data into the processor; and after 100 nanoseconds has removed IOC2.

In the bus interface unit, when DTSY drops, DTAC to the bus and WRST to the subsystem are removed. When IOC2 drops, the signals DATEN and DTIN are removed.

When the signal $\overline{DATC}$ goes low it triggers the 200 nanosecond monostable at its A input, which causes its $\overline{Q}$ output to go low. This triggers the flip-flop at its clock input, which has its D input true ($\overline{DATC}$) and therefore sets. The NAND gate at the A input of monostable DAKR now has the inputs from the flip-flop and the inverse of DATC true. After approximately 200 nanoseconds the $\overline{Q}$ output of the first monostable again becomes true so that the NAND gate is enabled and supplies a transition from high to low at the A input of monostable DAKR to trigger it. This signal is also used to disable the SELCT driver. A 70 nanosecond pulse then appears at the $\overline{Q}$ output which is used to clear flip-flops SLCS and ACKF to thereby return the bus interface unit to the idle state.

In the bus control unit, when DTAC drops this enables the input K of flip-flop BDTS2.

The first clock pulse after the dropping of DTAC resets flip-flop BDTS2. This makes the end of data cycle signal BEDTC true. This signal is connected to the K input of flip-flops BDTS1 and BDTS4.

The second clock pulse resets flip-flops BDTS1 and BDTS4. This causes the signal BDTCY to go high. This is the end of the data cycle.

Data Out Operation

The operation for data out is substantially the same. It starts with a signal on lead STOT from the central processing unit, which process STOTIN to flip-flop BCFFA. The signal $\overline{STOT}$ at the input PRE of flip-flop DTOM sets it to indicate a data out operation, and flip-flop DTIM is not set. When the signal on lead BMBTR occurs it resets DTOM and sets DTOB. The output of DTOB in coincidence with BDTS0 produces BDOSTR during the data cycle as a data out strobe. This in turn provides a signal on lead IOC1 (low level $\overline{IOC1}$ on the bus). In FIG. 6, the signals on leads BDTOTB and DISTR enable gates for coupling data from ALR1-ALR-20 in the central processing unit CPU to the bus conductors $\overline{DAT01}$ – DAT20. In FIGS. 7 and 8, the signal on lead DIOC causes signals on leads SDTEN, $\overline{DTOT}$ and $\overline{RDST}$ so that data is gated to leads $\overline{SDAT01}$ – $\overline{SDAT20}$ and stored in the subsystem.

What is claimed is:

1. A communication switching system comprising:

a bus, a central processor coupled to said bus, bus control means connected to the central processor and to the bus, a plurality of subsystems of diverse functional subsystem types, each subsystem comprising at least one subsystem module, said subsystem modules including at least call register modules for connection to calling lines and a program memory module having instructions stored therein, each having a plurality of sets of memory devices, each set having an address individual thereto, and a portion of the address being common to all sets within a module and being unique to the module, a plurality of bus interface units each individual to a corresponding module, each bus interface unit interposed between its module and said bus, and each having control circuits and an address detector with means to detect said portion of the address unique to its module, said bus interface units being substantially identical except for having different means in said address detector insuring that any address is detected by only one unit;

means to supply addresses from the central processor via the bus to select one subsystem module and a set within that module, and means to selectively either supply data from the central processor via the bus to the selected module and set or from the selected module and set via the bus to the central processor;

and call processing means wherein the central processor includes means to select program addresses to read instructions from the program module via the bus, and means determined by the instructions to select the other subsystem modules to supply and receive call data to and from them via the bus, wherein the call data includes call digits received from calling lines by the call register modules.

2. A communication switching system according to claim 1, further including a second bus and a second central processor coupled to the second bus and having its own bus control means, said bus interface units each including duplicate circuits for connection to both busses, said circuits connected in common to the same subsystem module.

3. A communication switching system as claimed in claim 2, wherein both sets of duplicated circuits of a bus interface unit include selection means operative responsive to detection of said portion of the address unique to its module, wherein the selection means may both be operated at the same time, and further including a lock out arrangement operative to permit only one set of the duplicate circuits to become active so that the associated module is connected to the data conductors of only one of the two buses at a time for communication of data between it and the central processor of the selected bus.

4. A communication switching system as claimed in claim 2, wherein some of said subsystem modules comprise a single memory with access circuits connected to the bus interface unit and means to be accessed via either of the buses.

5. A communication switching system as claimed in claim 4, wherein other of said subsystem modules comprise a single memory with duplicate memory control circuits, each having its own bus interface unit with means for connection to its own one of the two buses.

6. A communication switching system as claimed in claim 5, wherein still other of said subsystem modules have duplicated memory and control circuits each with its own bus interface unit with means for connection to its own one of the two buses.

7. A communication switching system as claimed in claim 6, wherein some of said subsystems comprise a plurality of modules of the same subsystem type, each module having its own bus interface unit, and wherein said address detector includes means to detect a portion of the address unique to the subsystem type, and a further portion of the address unique to the module.

8. A communication switching system as claimed in claim 2, wherein the first said central processor and said second central processor comprise means to operate autonomously without synchronization.

9. A communication switching system as claimed in claim 8, wherein there is means to place one of the central processors on line for call processing, and means to operate the other central processor for test routines with means to inhibit writing information into the memories of the subsystem modules.

10. A communication switching system as claimed in claim 2, wherein for the first said central processor and said second central processor each has a separate subsystem for a program memory, and each has its own bus interface unit with means to access it via its own bus.

11. A communication switching system as claimed in claim 10, wherein there is a separate subsystem as a data memory having associated therewith duplicate memory controls each having its own bus interface unit, with means to access the data memory from either central processor unit via the associated bus interface unit and memory control.

12. A communication switching system as claimed in claim 11, further including a separate subsystem as a status detector with duplicate memory controls, each having its own bus interface unit, with means for accessing the status detector from either central processor via the associated bus interface unit and memory control.

13. A communication switching system as claimed in claim 12, wherein said data memory is of a type comprising a plurality of ring-shaped magnetic cores with an individual sense winding on each core, word wires selectively threaded through the inside of some cores and outside of others to thereby store information, and memory input address means to select one of said word wires and supply a current pulse thereto, to thereby generate an output pulse in a sense winding of each core having the selected wire threaded through it.

14. A communication switching system as claimed in claim 13, wherein the program memory for each central processor comprises a plurality of integrated circuit chips with means responsive to address and select signals from its memory control to supply an instruction word.

15. A communication switching system as claimed in claim 2, wherein one subsystem comprises dialing registers having a plurality of said call register modules, with the address detector including means to detect an address designating the dialing register subsystem, and a further portion of the address designating the individual module.

16. A communication switching system as claimed in claim 1, wherein one subsystem type includes a program memory and another subsystem type includes a data memory, and wherein said address detector includes means to select either subsystem type.

17. A communication switching system as claimed in claim 16, wherein said program memory comprises integrated circuit chips, and said data memory comprises a plurality of ring-shaped magnetic cores with an individual sense winding on each core, and word wires selectively threaded through the inside of some of said cores and outside of others to thereby store information, and each having means responsive to an appropriate address to read information therefrom.

18. A communication switching system as claimed in claim 16, wherein a further subsystem comprises a status detector including means responsive to address information to read the status of peripheral units and supply corresponding data to the central processing unit.

19. A communication switching system as claimed in claim 16, wherein said program and data memory subsystems are separate from other subsystems, and wherein the system includes means such that the program and data memory subsystems may be expanded for future remote control uses.

20. A communication switching system as claimed in claim 1, wherein each of the bus interface units includes an interface-unit receiver comprising gates having inputs from the bus, wherein the connections to the address detector include an arrangement of three terminal points for each input, one of the terminal points being connected to the input of the address detector, another being connected to the connection from the interface-unit receiver, and the other being coupled via an inverter to the interface-unit receiver, and wherein a jumper is connected between the address detector input terminal point and one of the other two terminal points according as to whether that bit of the address is a 1 or a 0.

* * * * *